US007466261B1

(12) United States Patent
Hoctor et al.

(10) Patent No.: US 7,466,261 B1
(45) Date of Patent: Dec. 16, 2008

(54) METHOD AND SYSTEM FOR RADIO DETECTION AND RANGING INTRUSION DETECTION SYSTEM

(75) Inventors: Ralph Thomas Hoctor, Saratoga Springs, NY (US); Jeffrey Michael Ashe, Gloversville, NY (US); Vincent Paul Staudinger, Niskayuna, NY (US); Kenneth Brakeley Welles, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/460,143

(22) Filed: Jul. 26, 2006

(51) Int. Cl.
*G01S 13/12* (2006.01)
*G01S 13/10* (2006.01)
*G01S 13/00* (2006.01)

(52) U.S. Cl. .......................... 342/137; 342/27; 342/59; 342/89; 342/94; 342/95; 342/118; 342/134; 342/146; 342/147; 342/175; 342/195

(58) Field of Classification Search ............... 342/21, 342/27, 28, 59, 118, 134–145, 175, 189–197, 342/450–465, 73–81, 89, 94–103, 146–158; 340/500, 540, 541, 552–554, 565
See application file for complete search history.

(56) References Cited

U.S. PATENT DOCUMENTS

| 2,881,421 | A | * | 4/1959 | Grosjean | 342/59 |
|---|---|---|---|---|---|
| 2,939,134 | A | * | 5/1960 | Van Atta | 342/59 |
| 3,161,870 | A | * | 12/1964 | Pincoffs | 342/59 |
| 3,179,355 | A | * | 4/1965 | Pickering et al. | 342/59 |
| 3,184,739 | A | * | 5/1965 | Franklin et al. | 342/59 |
| 3,324,468 | A | * | 6/1967 | Knepper | 342/59 |
| 3,691,558 | A | * | 9/1972 | Hoard et al. | 342/28 |
| 3,706,096 | A | * | 12/1972 | Hammack | 342/194 |
| 3,795,911 | A | * | 3/1974 | Hammack | 342/463 |
| 3,821,751 | A | * | 6/1974 | Loos | 342/59 |
| 3,953,856 | A | * | 4/1976 | Hammack | 342/458 |
| 3,996,590 | A | * | 12/1976 | Hammack | 342/465 |
| 5,381,156 | A | * | 1/1995 | Bock et al. | 342/59 |
| 5,410,314 | A | * | 4/1995 | Frush et al. | 342/59 |
| 5,920,279 | A | * | 7/1999 | Andersson | 342/59 |
| 6,614,384 | B2 | * | 9/2003 | Hall et al. | 342/28 |
| 6,677,887 | B2 | | 1/2004 | Harman | |
| 6,822,604 | B2 | * | 11/2004 | Hall et al. | 342/28 |
| 6,956,523 | B2 | * | 10/2005 | Mohan | 342/195 |
| 7,129,886 | B2 | * | 10/2006 | Hall et al. | 342/28 |

\* cited by examiner

*Primary Examiner*—Bernarr E Gregory
(74) *Attorney, Agent, or Firm*—Richard A. DeCristofaro

(57) ABSTRACT

A RADAR system including a set of RADAR apparatuses is disclosed. Each apparatus includes a processor, a pulse unit in signal communication with the processor, a waveform signal generator in signal communication with the pulse unit, and a set of radar antennas in signal communication with the waveform signal generator. The waveform signal generator is capable of generating a waveform signal in response to pulses provided by the pulse unit. The set of antennas is capable of transmitting a burst of microwave energy in response to each waveform signal and to receive a plurality of reflected bursts associated with the transmitted bursts. An acquisition unit is configured to develop and amplify a finite window integral associated with each reflected burst, the acquisition unit in signal communication with the set of antennas and a preprocessor configured to digitize and store information relating to each finite window integral for subsequent processing.

42 Claims, 11 Drawing Sheets

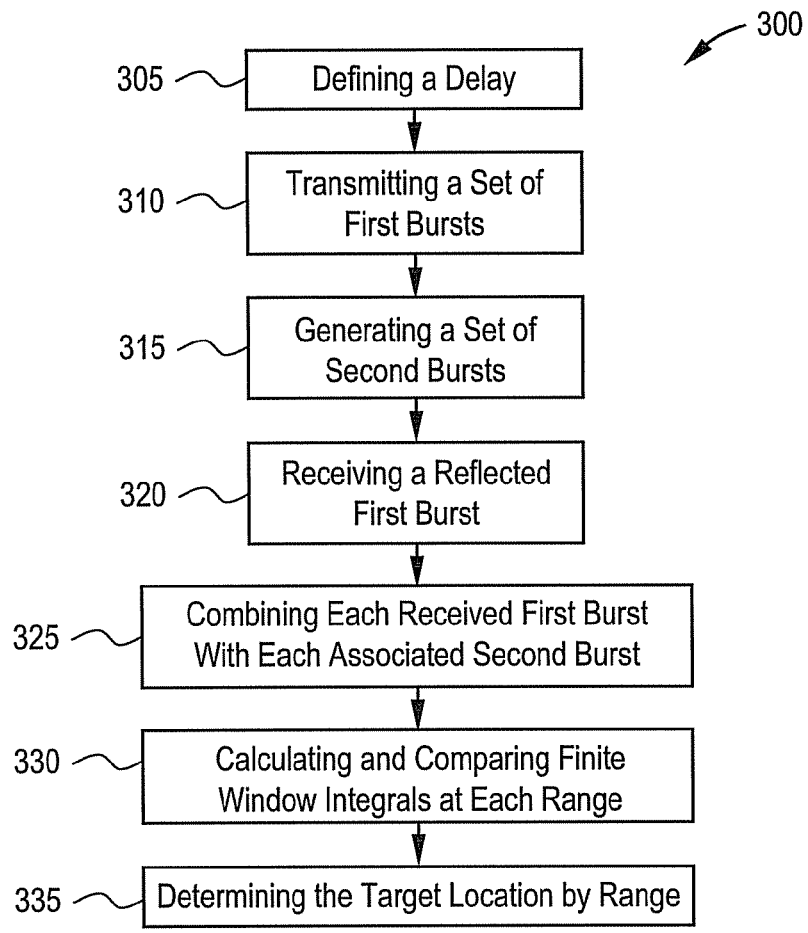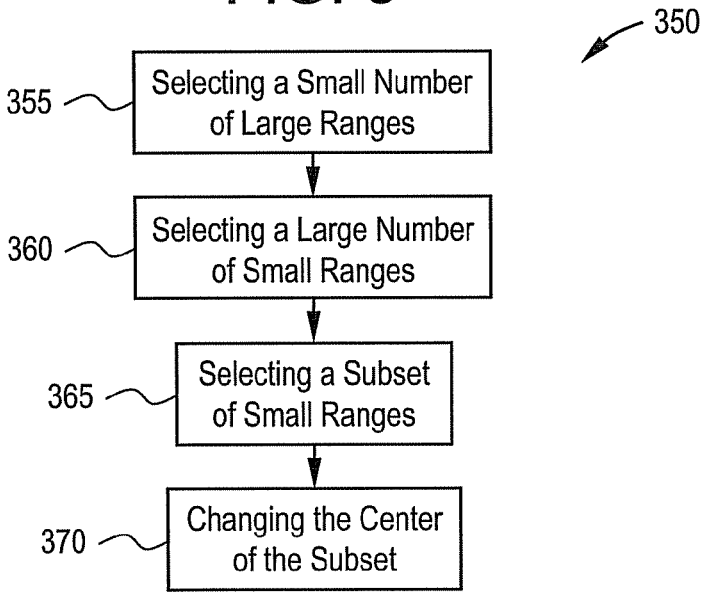

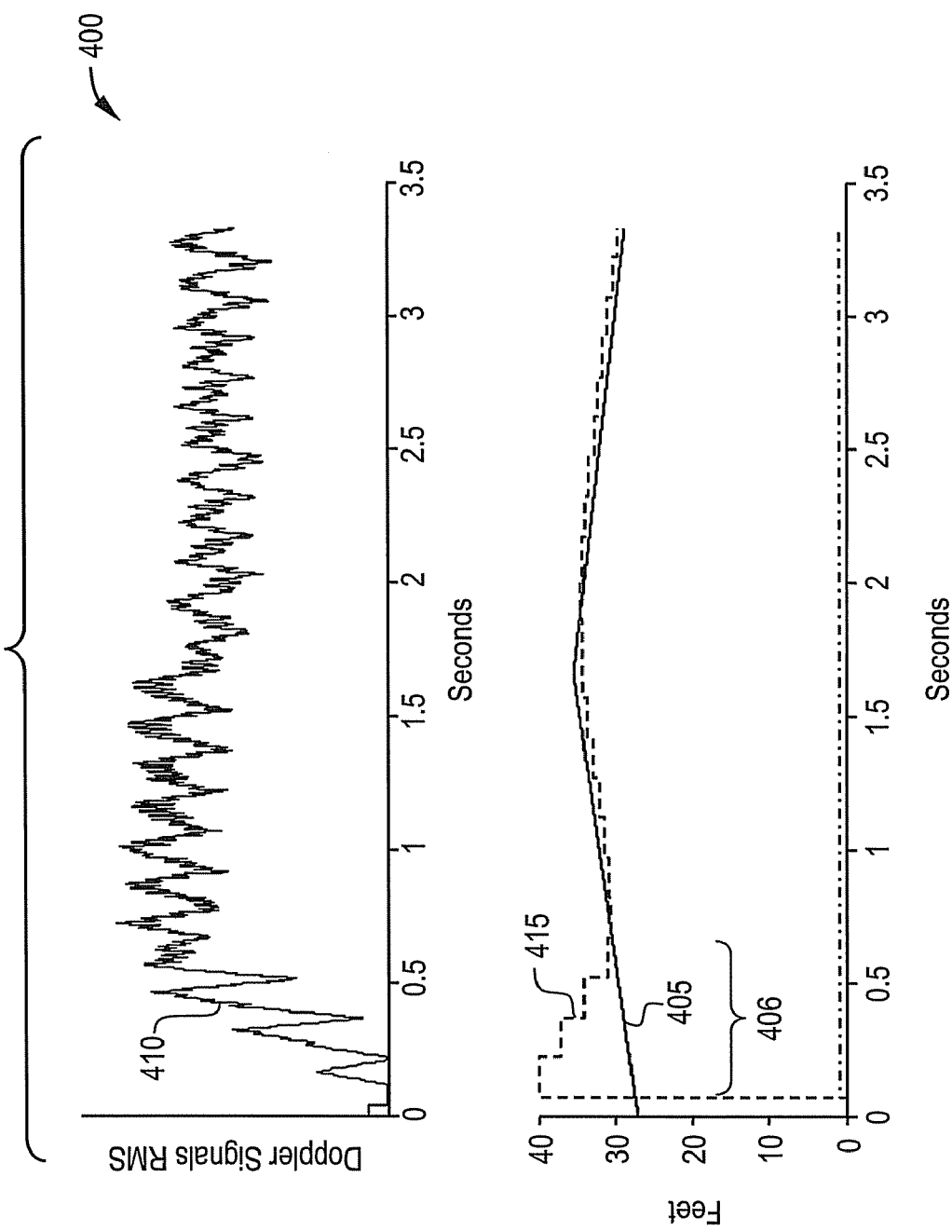

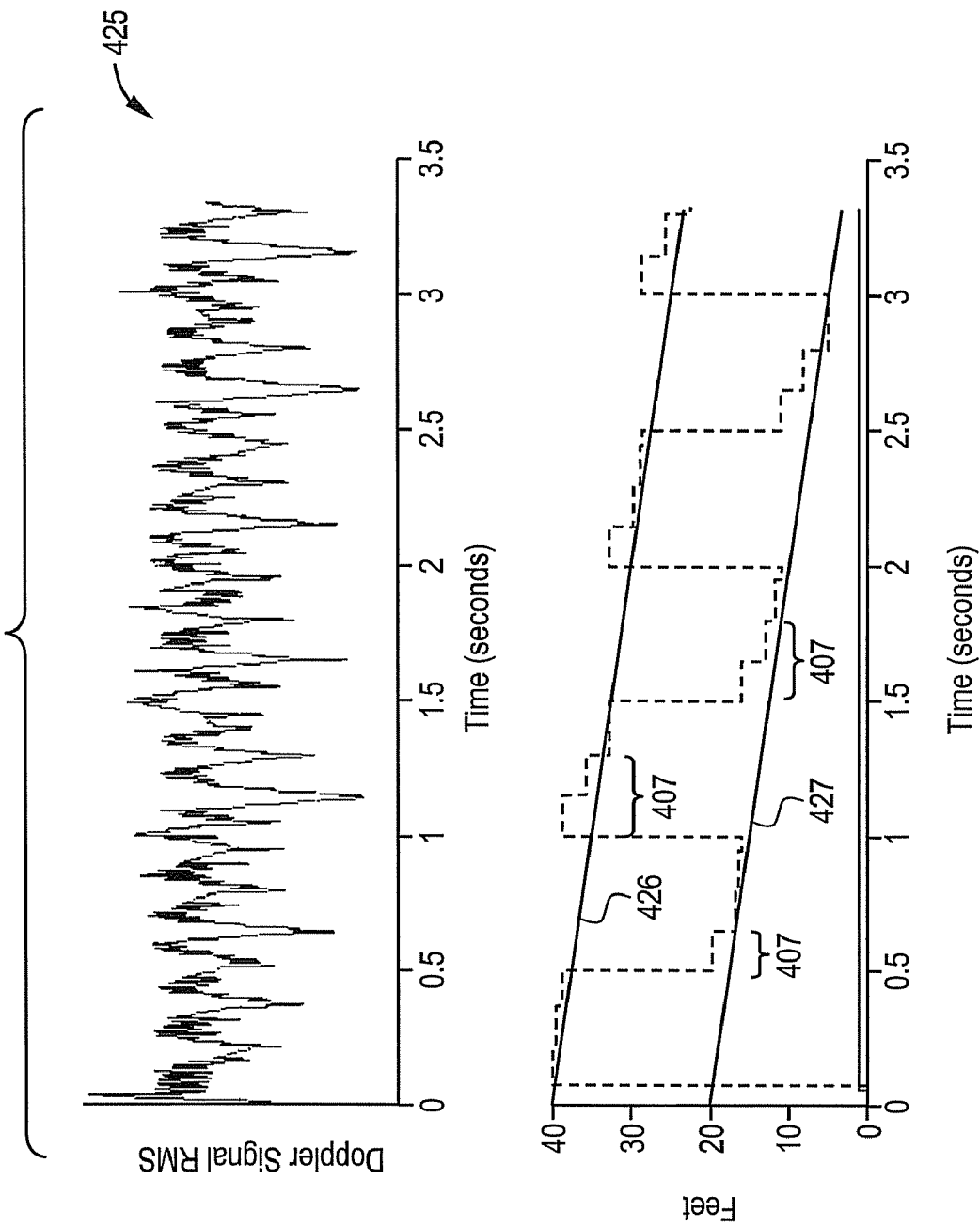

2 targets found

METHOD AND SYSTEM FOR RADIO DETECTION AND RANGING INTRUSION DETECTION SYSTEM

BACKGROUND OF THE INVENTION

The present disclosure relates generally to intrusion detection systems, and particularly to radio detection and ranging (RADAR) intrusion detection systems.

There is a need for indoor security devices to monitor areas subject to penetration by trespassers and also to alert authorities when personnel have entered a hazardous zone. One commonly employed technique is that of electromagnetic RADAR. It is well known in the art that a RADAR system may be used to monitor an area even though there is no direct visible line of sight from the RADAR unit to the area under surveillance, as a RADAR signal may often successfully penetrate and return through common building materials, thereby allowing the RADAR unit to be hidden or inconspicuous.

Referring now to FIG. 1, a block schematic diagram of a basic signal processing operation is depicted. A baseline system 100 operates as a simple Pulsed Doppler radar using analog signal processing. A radio frequency (RF) pulse generator 105 produces a first burst and a second burst of microwave energy via an antenna 110, the bursts having a center frequency of 5.8 GHz (+/−75 MHz). As used herein, the term burst shall refer to a short duration portion of a sine wave of microwave energy. This frequency is part of the Industrial, Scientific, and Medical (ISM) band reserved for unlicensed use at limited transmit power levels. In the United States, three of the commonly used ISM bands occupy frequencies from 902-928 MHz, 2400-2483.5 MHz (also herein referred to as the 2.4 GHz band), and 5725-5850 MHz (also herein referred to the 5.8 GHz band). The two bursts are separated by some time interval from about 10 nanoseconds (ns) to about 80 ns, depending on the range of the region to be monitored, thereby defining the range to be monitored. In an embodiment, the duration of the bursts shall be less than the delay between the first and second burst. The burst pairs are generated at a rate of roughly 12 kHz. The first burst illuminates the target and the second burst (also herein referred to as a reference burst) is used to derive a Doppler signal. The RADAR unit 100 transmits the second burst in addition to the first, but the return of the second burst is ignored and has no effect on the processing. If it is desired that the RADAR not actually transmit the second burst, this can be accomplished through the use of a standard RADAR structure, where the reference burst is supplied to the receiver by a separate local oscillator and the antenna is switched back and forth between transmitter and receiver subsections by an analog switch. Such structures are described, for example, in *RADAR Design Principles*, by F. E. Nathanson (McGraw Hill, 1991).

In response to the reception of the reflection of the first transmitted burst at the antenna 110 it is, in effect, added to the second burst, and the sum is processed by a signal processing chain 115, starting with an envelope detector 120. The envelope detector 120 (also herein referred to as a non-linearity or a demodulator) may comprise one or more diodes in series followed by a low-pass filter (LPF) 130. For the duration of that period during which the reflected burst overlaps with the reference pulse, the amplitude of the envelope detector (also herein referred to as a demodulator) 120 output oscillates with a frequency equal to the difference of the frequency of the reference burst and the reflected first burst. If a target is moving at one foot/sec, the Doppler frequency is approximately 12 Hz when using a center frequency in the 5.8 GHz band, so that the output of the demodulator 120 will appear constant over the overlap period for normal walking speeds. The output of the demodulator 120 should be considered a sampled version of a continuous Doppler signal, so that the output of the demodulator 120 is a 12 kHz pulse sequence composed of a static part and a part oscillating at the Doppler frequency. The static part originates in the non-overlapped portions of the reflected and reference pulses and includes a constant part within the overlap interval that is due to the difference in amplitude between the return burst and the reference burst. The oscillating part originates in the pulse overlap region, as described below.

If the envelope detector 120 is considered to be a half-wave square law device and the associated low-pass filter 130 has a critical frequency low enough to block a signal of the form $\cos(2\pi f_0 + \theta_0)$, where $f_0$ is the transmitted center frequency, and if the input is given by Equation-1:

$$input = \begin{cases} \cos(2\pi f_0 t + \theta_0) & \text{for } 0 \leq t < T_p - \Delta \\ \cos(2\pi f_0 t + \theta_0) + A_1\cos(2\pi f_1 t + \theta_1) & \text{for } T_p - \Delta \leq t < T_p \\ A_1\cos(2\pi f_1 t + \theta_1) & \text{for } T_p \leq t < 2T_p - \Delta \end{cases} \quad \text{Equation 1}$$

where:
t is a variable representing continuous time;
$\theta_0$ is a random initial phase angle of the transmitted and reflected bursts;
$A_1$ is the amplitude of the returned burst;
$T_p$ is the pulse duration;
$f_1$ is the Doppler-shifted center frequency of the radar return;
$\theta_1$ is the phase of the Doppler-shifted center frequency; and
$\Delta$ is the duration of the burst overlap.

The output of the envelope detector is approximated by Equation-2 to be:

$$output = \begin{cases} \dfrac{1}{2} & \text{for } 0 \leq t < T_p - \Delta \\ A_1\cos(2\pi(f_0 - f_1)t + \theta_0 - \theta_1) + \dfrac{1}{2}(1 + A_1^2) & \text{for } T_p - \Delta \leq t < T_p \\ \dfrac{A_1^2}{2} & \text{for } T_p \leq t < 2T_p - \Delta \\ 0 & \text{otherwise} \end{cases} \quad \text{Equation 2}$$

since the nonlinearity 120 will produce sum and difference frequencies for every narrowband signal passing through it, and the low-pass filter 130 will pass only the difference frequencies. (Here it is assumed that the reference burst appears first; the order of the first and last segment will be reversed in Equation-2 if the radar return is first.)

Referring now to FIG. 2, a burst 150 of the kind represented by Equation-2 is depicted. A central, raised portion 155 of the burst 150 oscillates and another portion 160 is static from burst to burst. It will be appreciated that FIG. 2 depicts an unrealistically strong reflected first burst, (or an unrealistically weak reference burst). It is considered in general that the reference burst has unit amplitude, and the typical amplitude of the return will be much less. Contrary to this expectation, FIG. 2 assumes $A_1=1$, showing that the return and reference have the same amplitude.

It will be appreciated that an amplitude of a signal at the output of an integrator 125 in FIG. 1 is proportional to the product of the duration of the burst overlap and the amplitude of the radar return (assuming unit amplitude reference burst). The "2-stage amp" low-pass filter 130 will convert the sequence of bursts 150, depicted in FIG. 2, coming from the envelope detector 120 into a continuous signal, and a high-pass filter 135 (also herein referred to as a DC block) will remove the portions of the output represented by Equation-2 that do not vary from burst to burst. Thus, the portion of the sequence of bursts represented by Equation-2 that contributes to the continuous signal at the output of the DC block may be approximated by Equation-3:

$$f(t) = A_1 \sum_{k=\infty}^{\infty} \cos(2\pi(f_0 - f_1)kT + \theta_0 - \theta_1) \mathrm{rect}_\Delta(t - kT) \quad \text{Equation 3}$$

where:
k is an index variable associated with the sequence of pulse pairs;
$\mathrm{rect}_\Delta$ is a rectangular time window of duration $\Delta$;
$\Delta$ is the overlap duration; and
T is the pulse repetition time.

It will be appreciated that this is an approximation because the amplitude does not change at all over the overlap interval.

If M is the component of the velocity of the target in the direction of the radar, then the frequency of the return is given by $$f_1 = f_0\left(1 - \frac{2M}{c}\right),$$

so at $$(f_0 - f_1) = \frac{2M}{c} f_0.$$

The Fourier transform (FT) of f(t) is given by Equation-4:

$$F(\omega) = A_1 e^{j\omega\frac{\Delta}{2}} \frac{2\sin\left(\frac{\Delta\omega}{2}\right)}{\omega} \sum_{n=-\infty}^{\infty} D\left(\omega - \frac{n}{T}\right) \quad \text{Equation-4}$$

where:
$\omega$ is the continuous radian frequency variable of the FT;
n is the index variable associated with the multiple frequency domain images of the Doppler spectrum; and
$D(\omega)$ is the FT of $$\cos\left(2\pi\frac{2M}{c}t + \theta_0 - \theta_1\right).$$

This is multiplied by the frequency response of the analog low-pass filter 130, $H(\omega)$, which suppresses all but the n=0 term:

$$G(\omega) = H(\omega)F(\omega) \cong A_1 e^{j\omega\frac{\Delta}{2}} \frac{2\sin\left(\frac{\Delta\omega}{2}\right)}{\omega} D(\omega) \quad \text{Equation-5}$$

Because the main lobe of the sinc function (sinc(t)=sin($\pi$t)/$\pi$t) in Equation-5 is much wider than the Doppler signal spectrum, the output of the low pass filter 130 is approximately equal to the inverse Fourier transform of the Doppler spectrum times the peak value of sinc function:

$$g(t) = \quad \text{Equation-6}$$

$$A_1 \mathfrak{F}^{-1}\left[\Delta e^{j\omega\frac{\Delta}{2}} D(\omega)\right] = A_1 \Delta \cos\left(2\pi\frac{2M}{c}\left(t - \frac{\Delta}{2}\right) + \theta_0 - \theta_1\right)$$

since the sinc function evaluated at zero is $$\left.\frac{2\sin\left(\frac{\Delta\omega}{2}\right)}{\omega}\right|_{\omega=0} = \Delta \quad \text{Equation-7}$$

Thus, the amplitude of this reconstructed continuous signal is proportional to $\Delta$, the overlap duration, times the amplitude of the return, $A_1$. If the center frequency of the Doppler signal is high enough (not too close to zero), the signal passes through the high-pass filter 135 (DC block), and the result is given by Equation-6. The analog Doppler signal at the output of the high-pass filter 135 is rectified by a full-wave rectifier 140 and the result is integrated to produce a Moving Target Indicator (MTI) signal, which is proportional to the amplitude of the Doppler signal. The time constant of this final integrator is important in that it determines a dwell time. The dwell time is that period which must elapse before the MTI signal fully responds to any change in range gate, pulse parameters or target motion. Simulations have used the dwell time of approximately 500 milliseconds. A signal 145 at the output of the integrator is compared to a threshold in the current system to detect the presence of a moving target.

The system described above is based on analog signal processing. At the input of the integrator 125, the signal-to-noise ratio must be great enough to allow detection. This means that the noise floor at that point must be lower than the signal level resulting from the maximum range and minimum range gate overlap for which detection is expected.

State of the art intrusion RADAR systems are capable to sense and respond to the motion of a target. As used herein, the word "target" shall refer to any moving object the radar system is capable to detect, with the understanding that the most common "targets" are likely to be people walking throughout the monitored area. Current indoor surveillance RADAR systems are limited to providing information relating only to the presence of motion within the monitored area. There is therefore a need to devise surveillance RADAR systems that can more effectively function in light of these shortcomings of the present systems in the art.

BRIEF DESCRIPTION OF THE INVENTION

An embodiment of the invention includes a RADAR system including a set of RADAR apparatuses. Each apparatus includes a processor, a pulse unit in signal communication with the processor, a waveform signal generator in signal communication with the pulse unit, and a set of radar antennas in signal communication with the waveform signal generator. The pulse unit has a first delay stage configured to provide a plurality of first pulses and a second delay stage configured to provide a plurality of second pulses, each first pulse having a variable delay controlled by the processor that is configured to allow each first pulse to be followed by one of the plurality of second pulse. The waveform signal generator is capable of generating a waveform signal in response to pulses provided by the pulse unit. The set of antennas is capable of transmitting a burst of microwave energy in response to each waveform signal and to receive a plurality of reflected bursts associated with the transmitted bursts. An acquisition unit is configured to develop and amplify a finite window integral associated with each reflected burst, the acquisition unit in signal communication with the set of antennas and a pre-processor configured to digitize and store information relating to each finite window integral for subsequent processing.

Another embodiment of the invention includes a method to determine a target location using a RADAR apparatus. The apparatus includes a processor, a pulse unit in signal communication with the processor, a waveform signal generator in signal communication with the pulse unit, and a set of radar antennas in signal communication with the waveform signal generator. The pulse unit has a first delay stage configured to provide a plurality of first pulses and a second delay stage configured to provide a plurality of second pulses, each first pulse having a variable delay controlled by the processor that is configured to allow each first pulse to be followed by one of the plurality of second pulses. The waveform signal generator is capable of generating a waveform signal in response to pulses provided by the pulse unit. The set of antennas is capable of transmitting a burst of microwave energy in response to each waveform signal and to receive a plurality of reflected bursts associated with the transmitted bursts. An acquisition unit is configured to develop and amplify a finite window integral associated with each reflected burst, the acquisition unit in signal communication with the set of antennas and a pre-processor configured to digitize and store information relating to each finite window integral for subsequent processing. The method includes defining the variable delay between the first and second pulses, for each of a set of ranges within a region that may contain the target, transmitting a set of first bursts in response to the first pulses for each range, and generating a set of second bursts in response to the second pulses for each range. Further, the method continues by receiving a reflected first burst associated with each of the transmitted first bursts associated with each range, combining each received first burst with each associated second burst associated with each range to create the finite window integral, calculating and comparing to each other the finite window integrals at each range, and, determining the target location by range based on the greatest finite window integral from the set of ranges.

Another embodiment of the invention includes a method to determine a target location using a RADAR apparatus. The apparatus includes a processor, a pulse unit in signal communication with the processor, a waveform signal generator in signal communication with the pulse unit, and a set of radar antennas in signal communication with the waveform signal generator. The pulse unit has a first delay stage configured to provide a plurality of first pulses and a second delay stage configured to provide a plurality of second pulses, each first pulse having a variable delay controlled by the processor that is configured to allow each first pulse to be followed by one of the plurality of second pulses. The waveform signal generator is capable of generating a waveform signal in response to pulses provided by the pulse unit. The set of antennas is capable of transmitting a burst of microwave energy in response to each waveform signal and to receive a plurality of reflected bursts associated with the transmitted bursts. An acquisition unit is configured to develop and amplify a finite window integral associated with each reflected burst, the acquisition unit in signal communication with the set of antennas and a pre-processor configured to digitize and store information relating to each finite window integral for subsequent processing. The method includes determining a phase angle corresponding to each of a set of horizontal angular positions associated with a region that may contain the target, transmitting a set of first bursts in response to the first pulses for each horizontal angular position of the set of horizontal angular positions, and generating a set of second bursts in response to the second pulses for each horizontal angular position, each second burst subsequent to each first burst, and capable of transmission. Further, the method continues with receiving a reflected first burst associated with each of the transmitted first bursts associated with the set of horizontal angular positions, combining each received reflected first burst with each associated second burst for each horizontal angular position of the set of horizontal angular positions to create a finite window integral, calculating and comparing to each other the finite window integrals at each horizontal angular position, and, determining a target location by horizontal angular position based on the finite window integral.

BRIEF DESCRIPTION OF THE DRAWINGS

Referring to the exemplary drawings wherein like elements are numbered alike in the accompanying Figures:

FIG. 4 depicts a flow chart diagram for determining the location of a target by range in accordance with an embodiment of the invention;

FIG. 5 depicts a flow chart diagram of a tracking algorithm in accordance with an embodiment of the invention;

FIG. 6 depicts a simulation of tracking the range of a moving target in accordance with an embodiment of the invention;

FIG. 7 depicts a simulation of tracking the range of two moving targets in accordance with an embodiment of the invention;

DETAILED DESCRIPTION OF THE INVENTION

An embodiment of the invention will provide the capability of range estimation to a RADAR surveillance unit. An embodiment of the invention is a RADAR surveillance unit that is mounted in a fixed location, and is expected to detect and compute the range (distance from the RADAR system) of any moving target in its field of view. Another embodiment of the invention will be part of a tracking system that features multiple surveillance units and a central computer to keep track of individual targets. The multiple units of the system will have overlapping regions in which targets can be detected, and so the system will be able to locate targets by triangulation and knowledge of the environment (where the walls and doors are). To the extent that each surveillance unit can supply azimuthal angle information in addition to range information, a target location can be computed that is potentially more accurate than one based only on range. Because there may be so many radar returns in the in-door environment, motion is used to discriminate targets of interest from stationary objects.

Figure 3:
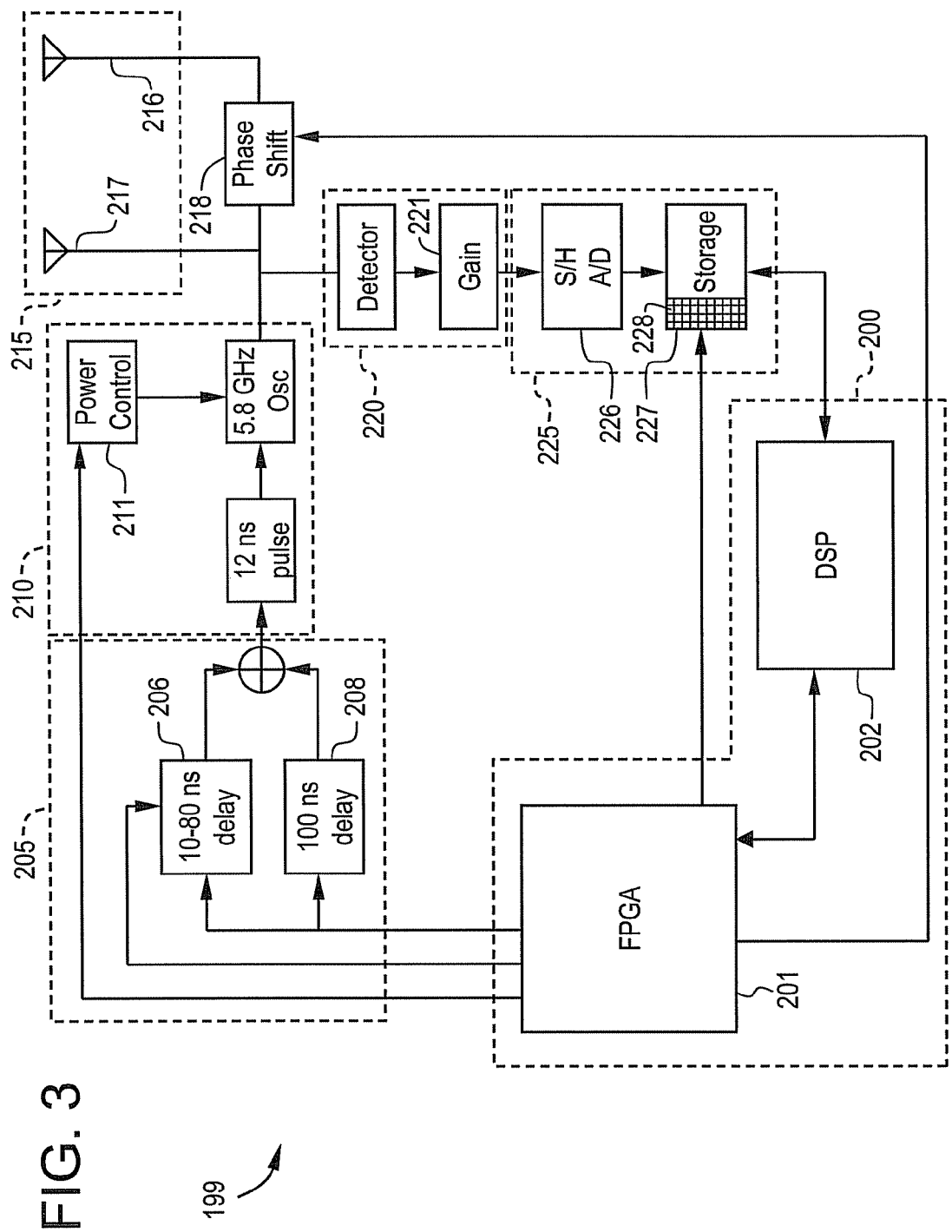
FIG. 3 depicts a block schematic diagram of an enhanced RADAR system in accordance with an embodiment of the invention.

Referring now to FIG. 3, an embodiment of an enhanced system 199, configured to provide target location information is depicted. In an embodiment, the enhanced system 199 may be used in conjunction with a plurality of systems 199. The system 199 comprises a processor 200, a pulse unit 205, a waveform signal generator 210, a set of radar antennas 215, an acquisition unit 220, and a pre-processor 225. In an embodiment, the processor 200 comprises a field programmable gate array (FPGA) 201.

The pulse unit 205 is in signal communication with the processor 200, and comprises a first delay stage 206 configured to provide a plurality of first pulses and a second delay stage 208 configured to provide a plurality of second pulses. Each first pulse has a variable delay controlled by the processor 200. The pulse unit 205 is configured to allow each first pulse to be followed by one of the plurality of second pulses. In an embodiment, each second pulse has a fixed delay.

The waveform signal generator 210 in signal communication with the pulse unit 205, and is capable of generating a waveform signal in response to each pulse of the first and second plurality of pulses.

The set of radar antennas 215 is in signal communication with the waveform signal generator 210. The set of antennas 215 is capable of transmitting a burst of microwave energy in response to each waveform signal generated by the waveform signal generator 210. The set of antennas 215 is also configured to receive a plurality of reflected bursts associated with the transmitted bursts. In an embodiment, the set of radar antennas 215 comprises two antennas: a first antenna 216 and a second antenna 217. In an embodiment, at least one phase shifter 218 is in signal communication with the first antenna 216. The phase shifter 218 is configured to phase-shift the bursts associated with the first antenna 216 relative to the bursts associated with the second antenna 217.

While an embodiment has been described having a set of antennas 215 having two antennas with one phase shifter 218, it will be appreciated that the scope of invention is not so limited, and that the invention also applies to a set of antennas that may have different numbers of antennas, such as three, four, or more, for example. The invention will also apply to such sets of antennas having more than one phase shifter, such as two, three, or more, for example. It is contemplated that phase shifters will be typically be arranged such that there will be one fewer phase shifters than the total number of antennas.

In an embodiment, the waveform signal generator 210 comprises a radiation intensity control 211 in signal communication with the processor 200. The radiation intensity control 211 is configured to vary the intensity of the radiation of the bursts inversely to the variable delay of the first delay stage 206. In an embodiment, the waveform generator 210 is configurable to generate a waveform conforming to the ISM bands.

Figure 2:
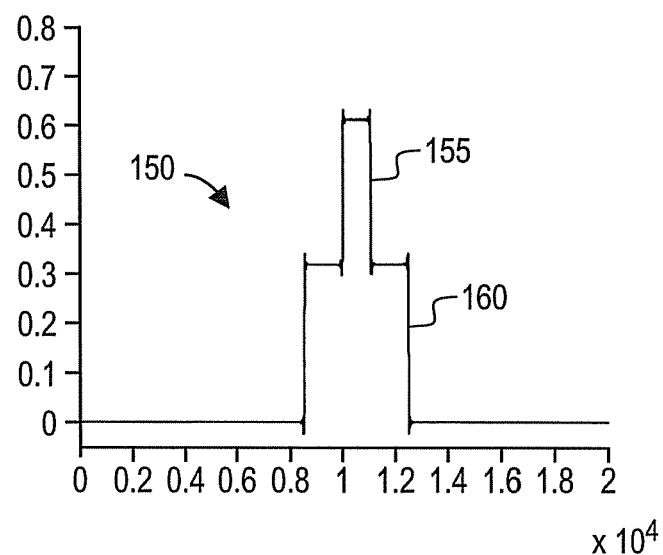
FIG. 2 depicts a wave diagram of a burst of microwave energy in accordance with an embodiment of the invention.

The acquisition unit 220 is in signal communication with the set of antennas 215, and is configured to detect and amplify a finite window integral of at least one of each reflected burst of the waveform depicted in FIG. 2. In an embodiment, the acquisition unit 220 comprises a wideband high gain amplifier 221 configured to amplify the finite window integral.

In an embodiment, one manner in which to implement a sampled data system is to integrate over the time window depicted in FIG. 2 and sample the resulting level for every burst, thereby providing the finite window integral. In an embodiment, such an integration time window might be 200 ns long, for example. The samples will be taken at the pulse repetition frequency (PRF), which is 12 kilohertz (kHz) in the baseline system. The signal to noise ratio (SNR) in a sampled data pulsed Doppler system will be higher than that in an analog system with the same PRF because of the limited integration time. That is, the analog system integrates continually, and so will include more noise in the Doppler signal than the sampled system does, while both systems will include the same signal and clutter. Thus, the SNR in the sampled system with finite integration time is independent of PRF, while the SNR in the analog system will increase with increasing PRF. There are several considerations to allow selection of the PRF at a desirable level in the sampled system. The PRF must be high enough so that the highest expected Doppler frequency is sampled at greater than the Nyquist rate. However, if too high of a PRF is selected, a sampled Doppler signal in which the Doppler energy is very close to the frequency origin in the discrete-time Fourier transform domain will result. This means that in order to separate it from the stationary response part of the signal by digital filtering, a longer finite impulse response (FIR) filter (or an infinite impulse response (IIR) filter with a longer impulse response) is required. This could possibly result in a loss of Doppler sensitivity if storage or computation time limitations are reached. In a sampled system, the PRF is set to give good sensitivity at the expected Doppler frequencies with consideration of the available computational resources.

Sampling at a much higher PRF than is dictated by the above considerations is possible, since the round-trip travel time to the exemplary 40 ft. maximum range is 80 ns and the time between pulses (at the 12 kHz PRF) is over 80,000 ns.

The long time between pulse firings allows interleaving pulse pairs with different spacings. This yields a high physical PRF, while allowing a low sample rate for the discrete Doppler signal at every range gate.

The pre-processor 225 is in signal communication with the acquisition unit 220 and the processor 200. The pre-processor 225 is configured to digitize and store the finite-window integrals produced by the acquisition unit 220 for subsequent processing. In an embodiment, the pre-processor comprises a sample and hold analog-to-digital converter 226 configured to digitize each amplified finite-window integral, and a storage unit 227 comprised of a plurality of storage locations 228 configured to store each of the digitized finite-window integrals. In an embodiment the sample and hold analog-to-digital converter 226 comprises a 16-bit analog-to-digital converter.

The processor 200 is in digital signal communication with the pre-processor 225 by way of shared access to the data storage locations 228. The processor 200 is configured to apply a digital high-pass filter to the sequence of digitized finite-window integrals associated with a particular range. The output of this digital filter will be a sampled Doppler signal whose energy is estimated in order to detect the presence of a moving target at the range associated with the filtered data sequence. This energy estimation is implemented by squaring the Doppler signal to produce an estimate of the instantaneous power, and digitally integrating (summing) over the dwell time to estimate Doppler energy. In one embodiment, this filter will be a finite impulse response digital filter, and the data storage unit 227 will hold the sequence of the last N samples produced by the analog-to-digital converter 226. In another embodiment, the filter will be an $M^{th}$ order infinite impulse response filter, and the data storage unit 227 will hold the M state variables of the filter, after processing of all samples collected up to the present time.

The relation between the overlap duration, which is a function of the delay between the first pulse and the second pulse, and the amplitude of the Moving Target Indicator signal into the processor 200 as expressed in Equation-6 can be used to estimate the range of the moving target, since the amplitude of the MTI signal will be maximized in response to maximization of the degree of overlap between the transmitted and reflected bursts. This overlap maximization occurs when the duration of the interval between the pulses is equal to the round-trip pulse transit time. This time interval can be changed at the transmitter until the MTI signal takes its maximum value.

In view of the foregoing, the enhanced system 199 performs the method of determining the location of the target by range, or, the distance of the target from the radar system 199.

Referring now to FIG. 4, an exemplary embodiment of a method 300 for determining the location of a target by range is depicted. The method 300 begins by defining 305 a delay of the variable delay, thereby defining a delay between the first and second pulses to be generated by the pulse unit 205, for each of a set of ranges within a region that may contain the target. Next is transmitting 310 a set of first bursts in response to the first pulses generated by the pulse unit 205 for each range. The method proceeds with generating 315 a set of second bursts in response to the second pulses for each range, each second burst subsequent to each first burst and capable of transmission by the set of antennas 215. In an embodiment, the generating 315 comprises generating 315 a set of second bursts absent transmission by the set of antennas 215 of the set of second bursts. In an embodiment, the processor 200, in conjunction with the radiation intensity control 211, waveform signal generator define a radiation intensity for each range.

After the first bursts have been transmitted 310, the method 300 continues by receiving 320 a reflected first burst associated with each of the transmitted first bursts associated with each range. Along with receiving 320 the first bursts, combining 325 each received reflected first burst with each associated second burst, associated with each range, to create the finite window integral. After collection of finite window integrals representing more than one range, calculating and comparing 330 to each other the finite window integrals at each range; thereby determining 335 the target location by range based on the greatest finite window integral from the set of ranges. In an embodiment, the generating 315 comprises generating a set of second bursts absent transmission of the set of second bursts.

Referring back to FIG. 3, in an embodiment, the processor 200 comprises a digital signal processor (DSP) 202 as well as the FPGA 201. The DSP 202 determines a sequence of range firings and firing rate to be performed. This data is downloaded to the FPGA 201. The FPGA 201 controls a rapidly varying sequence of range firings by selecting the variable delay of first delay stage 206, and selecting the radiation intensity via the radiation intensity control 211, with greater intensity corresponding to shorter selected variable delays, which are associated with greater ranges. As an example, assuming a 65 ns delay is selected, the FPGA 201 will trigger both the first delay stage 206 and the second delay stage 208. After 65 ns have elapsed, the 5.8 Gigahertz (GHz) Oscillator is turned on to create the first burst for a 12 ns period. After another 35 ns have elapsed, the Oscillator is turned on to create the second burst for a 12 ns period.

Because the MTI signal is responsive only to a moving target, which means that the range is changing while range estimation is going on, a tracking algorithm must be implemented. One embodiment of such a tracking algorithm is the following: At each step, three ranges are selected, the current nominal range estimate, a farther range and a nearer range. The range gate is moved to each range in turn and held there for the dwell time, after which the signal is sampled and used as the MTI amplitude estimate for that range gate position. If one of the MTI amplitude estimates is larger than the nominal, it becomes the new nominal range. If the nominal range gate has the largest value, then quadratic interpolation is performed to estimate the location of the maximum MTI amplitude, and that becomes the new nominal range.

Referring now to FIG. 5, an embodiment of a tracking algorithm 350 configured to determine the set of ranges to evaluate is depicted. The algorithm works in three distinct phases. It begins unaware of the presence of the target, selecting 355 an initial, small number of large ranges to evaluate in order to determine the presence of the target. In response to the system 199 detecting the presence of the target, selecting 360 a large number of small ranges to estimate the target distance. The system 199 uses the shortest range gate possible, given the available bandwidth. In an embodiment, it will start with a far range estimate and move toward the system 199 until the target is found. In response to finding and estimating the target distance, selecting 365 a subset of small ranges centered about the estimated target distance to calculate the target distance. Finally, as from one range to another, in response to motion of the target, the algorithm changes 370 the center of the subset of small ranges to the range having the greatest finite window integral.

Referring now to FIG. 6, a noise-free simulation 400 of this approach is depicted. The simulation begins with a 25 ns range gate located at a range of 40 feet (ft) from the radar (80 ns separation between the transmitted and reference burst). The further and nearer ranges are +/−6 ft from the nominal range estimate. The moving target, depicted by line 405 starts from a range of 26 ft, which is nearer to the radar than the coverage of the range gate, and it moves at a speed of 5 ft/sec away from the radar for about 1.6 seconds, after which it moves towards the radar at a speed of 3 ft/sec. The MTI signal 410 is depicted in the upper panel of FIG. 6 and is based on the dwell time of 0.042 seconds. The apparent modulation is due to switching between the three range gates. The estimated range is represented by line 415.

As can be seen from the simulation results, this approach results in a non-negligible, steady-state tracking error, represented by the gap between line 405 and line 415. The average absolute error in range estimation for this simulation, following acquisition 406, is roughly 0.8 feet. This error depends on target speed, and the average absolute error in a first phase, prior to the change of direction, was 0.84 feet, and less in the second phase. It will be appreciated that the average error during the acquisition phase 406 is much larger, having a peak error greater than 1 foot.

Referring now to FIG. 7, a simulation 425 including two targets located at different ranges is depicted. The attempt to track two targets requires the system to repeat the acquisition phase 407 each time the tracking is changed from one target to another because of the duration of time spent tracking the other target. The simulation 425 results depict the tracking of two targets, represented by lines 426 and 427 moving toward the radar at the same speed. The estimated range of each target is represented by the dashed line 429. Because the initial ranges of the two targets 426, 427 were provided to the simulation, the results illustrate tracking performance only. In this simulation the average error is much higher than that of FIG. 6, even though the range error for an individual target becomes low just before the time at which evaluation is switched from one target to the other.

In an embodiment, use of analog processing requires the dwell time to elapse in order to distinguish between which range produced the return signal, and generate an integrated MTI signal at each range. Accordingly, in an embodiment, changing the transmission of bursts from one range of the set of ranges to another range occurs in response to the dwell time having elapsed subsequent to initiation of the transmitting the set of bursts for each range of the set of ranges. Comparing the finite window integrals at each range occurs subsequent to the dwell time associated with that range. The result is that while the system is evaluating one range, or tracking one target, during the dwell time, it is not evaluating the other ranges or tracking the motion of the other targets.

It is possible to reduce the average error by use of a sampled data system with digital processing. If a sampled data system 199, rather than an analog system 100, is used, the bursts at all ranges can be interleaved, allowing acquisition of all range measurements required by the algorithm during a single dwell time. In the enhanced system 199, multiple range bursts can be mixed in any order and at any firing rate (as long as the interval between pulse pairs is long enough for echoes to disperse). This can be accomplished by digitizing the finite window integral via the sample and hold analog to digital converter 226 and storing the digitized energy in a storage location 228 selected by the processor 200 subsequent to the combining 325 each received reflected first burst with the associated second burst, to create the finite window integral. Accordingly, changing the transmission of bursts from one range of the set of ranges to another range is allowed to occur following the second pulse corresponding to each range.

Therefore, comparing 330 the finite window integrals at each range comprises digital signal processing to compare the stored finite window integrals at all ranges of the set of ranges subsequent to a single dwell time associated with all ranges having elapsed, as distinguished from the analog system, which requires the passage of as many dwell times as ranges to be evaluated.

In an embodiment, the enhanced system 199 will form, during the single dwell time, a set of overlapped range gates that cover the range interval to be monitored. For example, if the interval from 5 ft to 40 ft is to be monitored, 12 ns pulses will be transmitted to form 6 ft-long range gates at 4 ft, 7 ft, 10 ft, 13 ft, . . . up to 40 ft (thirteen ranges). All of this data will be available at a rate of 12 kHz (or any other appropriate PRF). This data will be generated by interleaving firings for different range gates and combining only those measurements from a given range to implement integration of the Doppler signal over the dwell time. For example, the first firing would delay the reference burst to implement a 4 ft range gate, the second would implement a 7 ft range gate, and so on. After the 40 ft range gate, the system would return to the 4 ft range gate. These pulses would be fired at a rate of 156 kHz, so that each range would be sampled at 12 kHz. This rate would result in over 6400 ns between burst firings (a period called the pulse repetition time, PRT), which is sufficient time for all radar returns to diminish and allow multiple burst pairs operating in the same area to be interleaved with each other.

Figure 1:
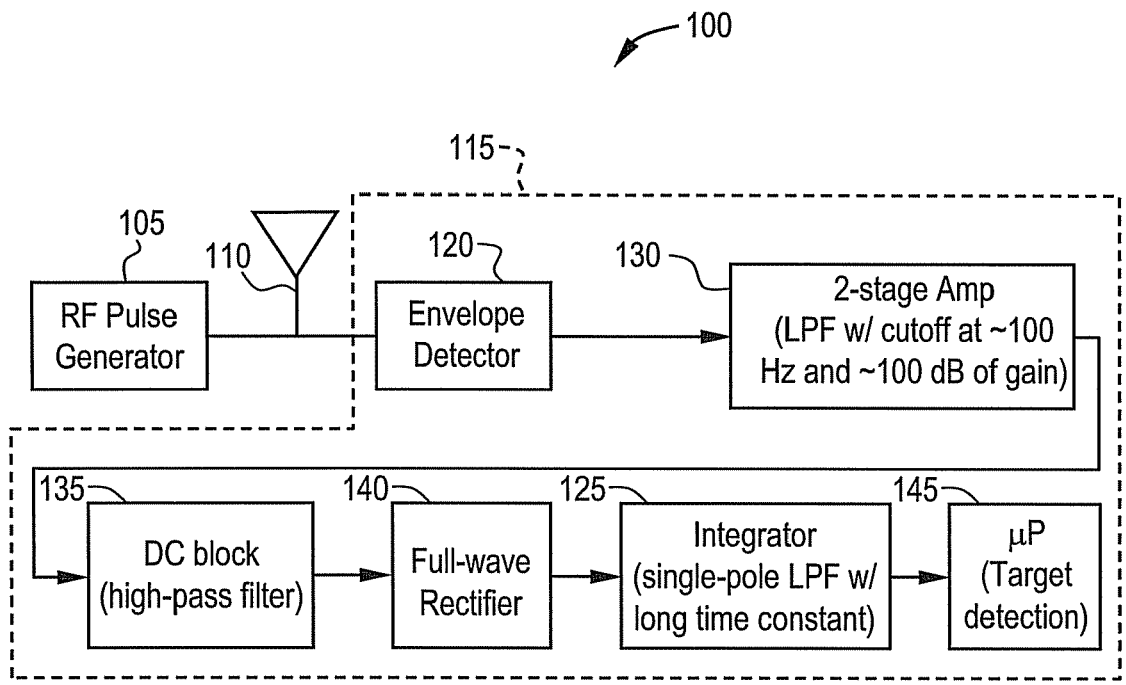
FIG. 1 depicts a block schematic diagram of an exemplary RADAR system in accordance with an embodiment of the invention.
Figure 8:
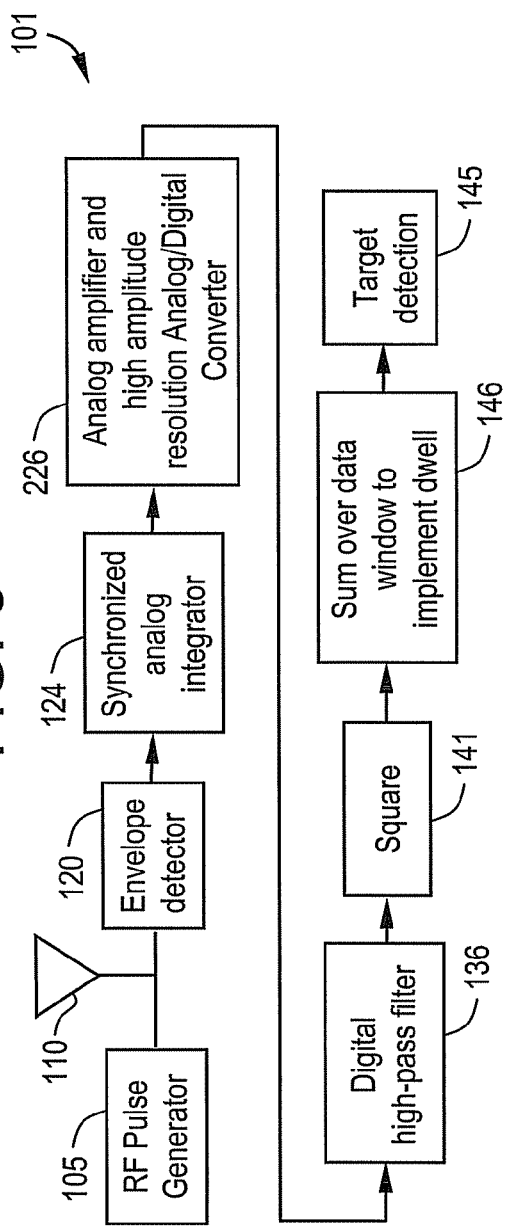
FIG. 8 depicts a block schematic diagram of a signal processing chain for an enhanced RADAR system in accordance with an embodiment of the invention.

Referring now to FIG. 8, a signal processing chain 101 of the enhanced system 199 is depicted in FIG. 8, which roughly resembles that of FIG. 1. Each time the burst pair is fired, an integrate-and-dump circuit is initialized by dumping its charge. The output of the analog envelope detector 120 is integrated by an integrator 124 over a 200-300 ns period that includes the reference range gate. At the end of this period the amplified output of the integrator 124 is sampled. The sampled signal at the $k^{th}$ pulse has the form $$f(k)=A_1\Delta \cos(2\pi(f_0-f_1)kT+\theta_0-\theta_1)+\text{stationary clutter} \quad \text{Equation-8}$$

where the "stationary clutter" terms are components of the signal that do not change from pulse to pulse. Because the amplitude of the clutter part may be large compared to the amplitude of the time-varying part, the amplitude resolution of the A/D converter 226 must be large enough so that the Doppler part of Equation-8 is well-represented.

Subsequent to the separation (or de-interleaving) of the sampled data into separate sets of data, each set of data associated with each separate range, digital signal processing is used to determine the MTI signal. The first digital operation is a high-pass filter 136 which blocks the portions of the signal described by Equation-8 that do not vary from pulse to pulse. After this step, the data is squared 141 and summed 146 in order to detect the energy that passes through the high-pass filter 136. This energy will be proportional to the square of the return amplitude times the overlap duration. The measure of this Doppler energy will be available at every range at the end of the single dwell time.

Figure 9:
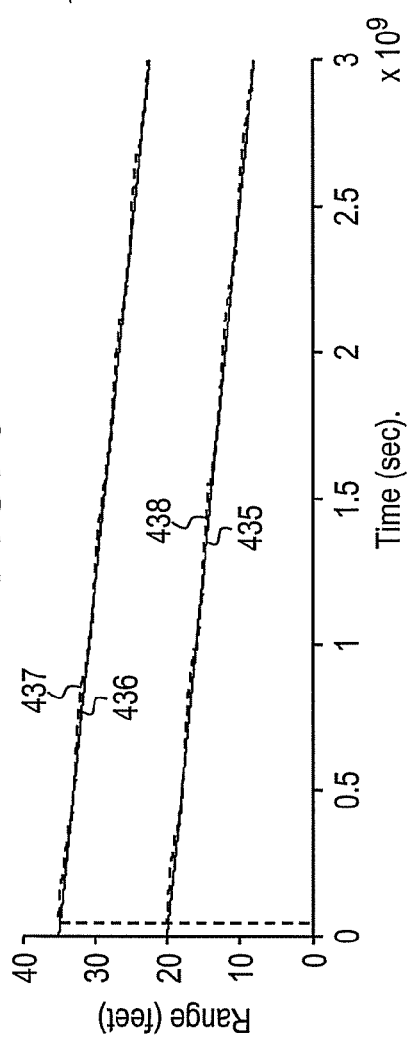
FIG. 9 depicts a simulation of tracking the range of two moving targets in accordance with an embodiment of the invention.

The algorithm used to locate targets will be different in the interleaved system 199, due to the availability of data at every range. After every dwell time, a vector of Doppler energies is available. These are all compared to a threshold, and the ranges for which the measurement is greater than the threshold are qualified by determining if the value is a local maximum. The qualified range cells are taken to have targets in them, and the range is computed via quadratic interpolation using the maximum value and the values next to it in distance, one farther and one nearer. This approach allows for immediate detection of targets when they appear in the illuminated region, and average accuracy of better than 1 foot in range estimation. The results of a range estimation simulation 430 of this approach are depicted in FIG. 9. Lines 435, 436 represent the location of two targets, while lines 437, 438 represent the location estimated by the system 199. It will be appreciated that as compared with the method depicted and described with reference to FIG. 7, the range estimations 437, 438 depict a very low mean error. The slight periodicity of the error has to do with the accuracy of the quadratic interpolation when the true peak is near the center of the considered interval as compared with when the true peak is off to one side.

Note that interleaving is used in Doppler ultrasound systems (color flow mappers) to increase the frame rate while maintaining a given PRF. Such systems work in the sampled data mode. The interleaving in ultrasound scanners is between pulses sent in different angles. The interleaving proposed here is primarily between multiple bursts transmitted in the same direction but gates at different ranges to produce Doppler information.

In addition to the ability to determine the range (distance), the enhanced system 199 is also capable to determine the azimuthal (horizontal position as determined from a top view) location of the target. In order to provide azimuthal location of the target, the system will utilize the set 215 of antennas in communication with the phase shifter 218.

In an embodiment, the two antennas 216, 217 are separated by half a wavelength at the center frequency, which is about 2.5 centimeters (cm) in the 5.8 Ghz band, for example. In an embodiment, the two antennas 216, 217 are dipole antennas. This constitutes a two-element phased array, also known as an array interferometer. Such an arrangement is known to be capable of canceling a narrowband response from a given direction. The phase shift is used to make the observations from the two antennas in exactly opposite phase when the target is in a certain direction, so that their sum is zero. This is called steering a null in the target direction, because the composite narrowband beam pattern of the two antennas has a zero in the target direction.

Figure 10:
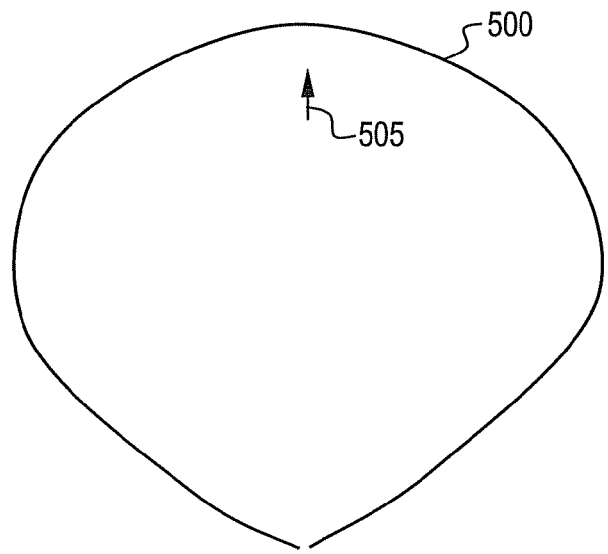
FIGS. 10-12 depict exemplary top views of RADAR radiation patterns in accordance with embodiments of the invention.

Referring now to FIG. 10, a top view of a radiation pattern 500 is depicted. A direction arrow 505 represents a forward-facing direction from the set 215 of antennas. The radiation pattern 500 depicted is that which results in response to the two antennas 216, 217 being in phase with each other.

Figure 11:
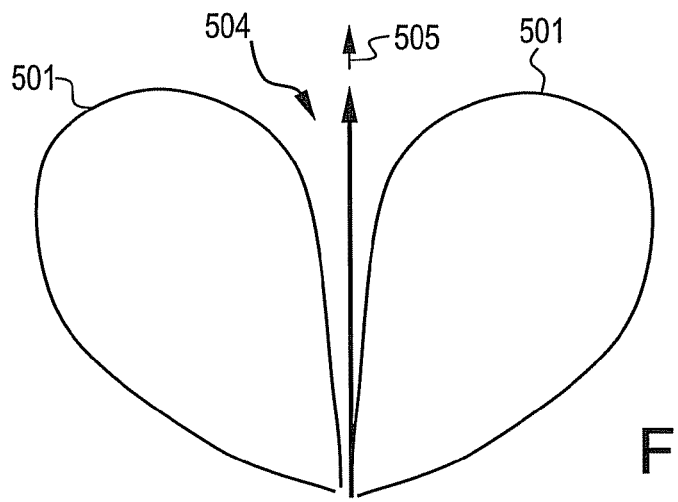
Figure 12:
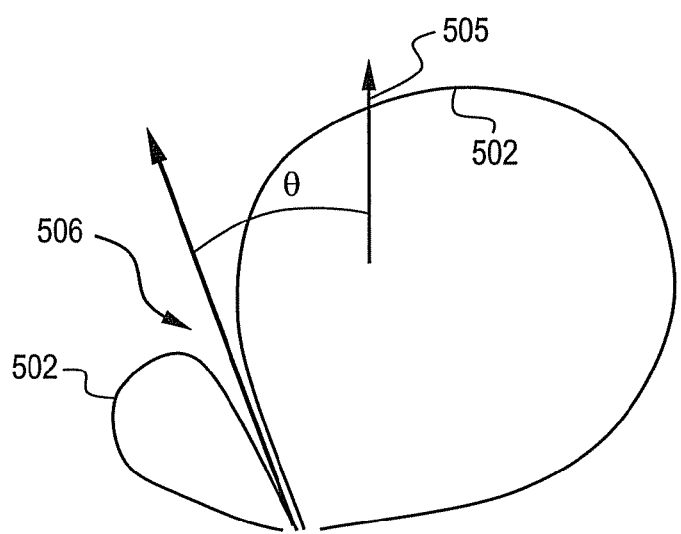

Referring now to FIGS. 11 and 12, a top view of radiation patterns 501, 502 containing a null 504, 506 are depicted. The null 504 shown in FIG. 10 is in response to the phase shifter 218 being configured to create a phase-shift of the signal of the first antenna 216 that is 180 degrees out of phase relative to the second antenna 217. It will be appreciated that the null 504 is directed in a forward-facing direction 505 outward from the set 215 of antennas. The null 506 depicted in FIG. 11 is in response to the phase shifter 218 being configured to create a phase-shift of the signal of the first antenna 216 that is some value other than 180 degrees out of phase relative to the second antenna 217. It will be appreciated that the null 506 has been directed relative to the forward-facing direction 505 outward from the set of antennas by an angle θ. Accordingly, it will be appreciated that selection of different out-of-phase angles will correspond to the null being directed at different angles θ relative to the forward facing direction 505.

In an embodiment, when the null 504, 506 is steered in the target direction, there will be no radar return, and so there will be no Doppler energy from that target. Because the direction of the null response can be determined from the phase shift between the set of antennas 215, the angle θ to the target can be determined from the phase shift that minimizes the Doppler energy. Because this is a narrowband technique and the return has non-zero bandwidth, some of the energy will get through the nulling operation. However, it should substantially reduce the signal. In an embodiment, the null 504, 506 may be created by performing the phase shift in conjunction with the transmitting of the bursts, the receiving of the bursts, or both.

Figure 13:
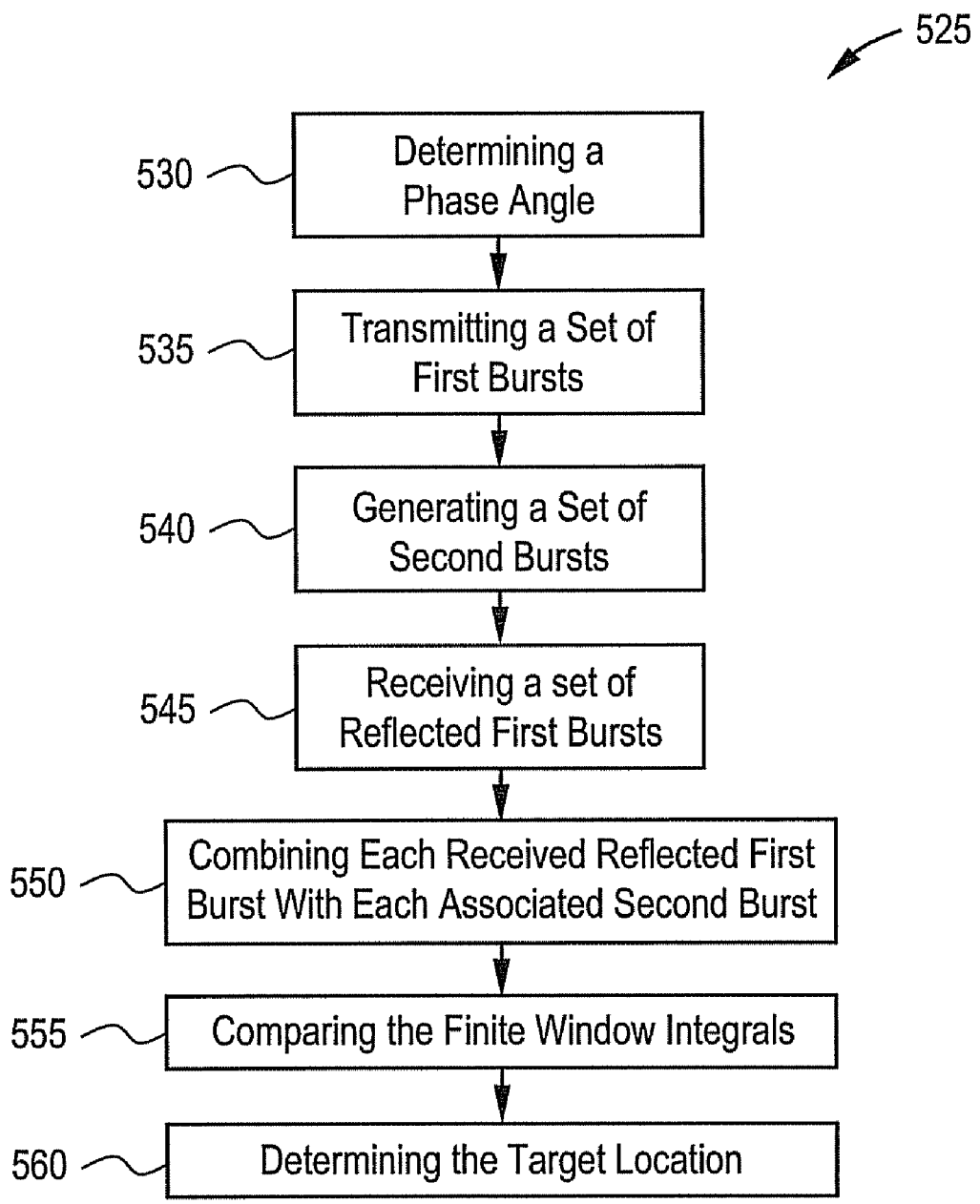
FIG. 13 depicts a flow chart diagram for determining the location of a target by azimuth in accordance with an embodiment of the invention.

Referring now to FIG. 13, an embodiment of a method 525 to determine target location by azimuth (also herein referred to as horizontal angular position) is depicted. The first step is determining 530 the phase angle corresponding to each of a set of horizontal angular positions associated with a region that may contain the target. The method continues with transmitting 535 a set of first bursts from the set of antennas 215 in response to the first pulses for each horizontal angular position of the set of horizontal angular positions, and generating 540 a set of second bursts in response to the second pulses for each horizontal angular position, each second burst subsequent to each first burst, and capable of transmission.

Subsequent to the first bursts being transmitted, receiving 545 at the set of antennas 215 a reflected first burst associated with each of the transmitted first bursts, associated with the set of horizontal angular positions, and combining 550 each received reflected first burst with each associated second burst, for each horizontal angular position of the set of horizontal angular positions, to create a finite window integral. The processor 200 then calculates and compares 555 to each other the finite window integrals at each horizontal angular position, and, finally determining 560 the target location by horizontal angular position based on the finite window integral. In an embodiment, the generating 540 comprises generating the set of second bursts absent transmission of the set of second bursts.

In an embodiment, at least one of the transmitting 535 or the receiving 545, for each horizontal angular position, comprises the phase shift of the determined phase angle between the first 216 and the second 217 antenna of the set 215 of antennas. In an alternate embodiment, the transmitting 536 is an omnidirectional transmission from only one antenna of the set of antennas 215, and only the receiving 545 comprises the phase shift.

In an embodiment, the same enhanced system 199 is capable to determine both the target range and horizontal angular position. In an embodiment, the system 199 will determine the range of the target, and subsequently evaluate horizontal angular positions, limiting the data gathering procedure to ranges at which the target has been previously detected.

In an embodiment, the DSP 202 determines a sequence of azimuthal steerings to be performed on the sets of RADAR bursts. Each steering angle has a different phase shift value associated with it in a look up table in the DSP 202. The corresponding phase shift data is downloaded to the FPGA 201. The FPGA 201 controls the phase shifter 218. When the radar burst is sent to the second antenna 217, a duplicate of that burst will be sent to the first antenna 216 as a phase shifted waveform. Note that in an embodiment, the return signal of the right antenna goes through the phase shifter 218 in the reverse direction, and may (as determined by the FPGA 201) incur another, identical phase shift. The sum of the return signals and the second burst then go to the acquisition unit 220.

In an embodiment, as described above with reference to range alone, the sampled data system 199, rather than the analog system 100, can be used to interleave the transmission of bursts at each range and horizontal angular position, allowing acquisition of all measurements required by the algorithm during a single dwell time. This can be accomplished by digitizing the finite window integral via the sample and hold analog to digital converter 226 subsequent to the combining 550 each reflected first burst, and storing the digitized energy in the storage location 228 selected by the processor 200. Accordingly, changing the transmission of bursts from one combination of range and horizontal angular position of the sets of ranges and horizontal angular positions to another combination of range and horizontal angular position is allowed to occur following the second pulse corresponding to the combination of range and horizontal angular position. Therefore, the comparing 555 the finite window integrals at each combination of range and horizontal angular position comprises digital signal processing to compare the stored finite window integrals at all combinations of range and horizontal angular position of the sets of ranges and horizontal angular positions subsequent to a single dwell time associated with all combinations of range and horizontal angular position having elapsed.

In an embodiment, the determining 530 a phase angle comprises determining a phase angle corresponding to each horizontal angular position, thereby creating the null 504, 506 directed in relation to the phase angle. Accordingly, the determining 560 a target location is based on the least finite window integral from the set of horizontal angular positions. As described above, this is known as null-steering.

In an embodiment, the FPGA 201 is used for several control functions (beam power, pulse pair spacing, phase shift, and stored signal addressing). The FPGA 201 is used instead of the DSP 202 because multiple bursts can be fired in a single microsecond. The FPGA 202 is configured to sequence the controls to steer these beams at high speed so that many different burst detection signals can be acquired in a short time.

Following is a further description and detailed example of the combination of the nulling technique with the interleaving concept to produce a single-radar spatial location system. Additionally, the output of the enhanced system 199 can be combined with the output of other such systems 199 to increase the location estimate accuracy. Omnidirectional measurements could be used to find the range, and the measurements using receive response patterns having nulls could be used to approximate the angle, by searching for that beam with the smallest Doppler power at the range of a detected target. Referring to the interleaving example given above with respect to range evaluation, it was determined that thirteen ranges could be interrogated at an arbitrary dwell time, using a physical pulse repetition time (PRT) of 6400 ns. Additionally, some number of receptions for each range that has nulls steered in known fixed directions can be incorporated. (It is also possible to make use of detected target ranges to have beams with nulls produced only for ranges at which targets have been determined to exist.) Seven such beams, incorporating directed nulls can be included for each range can be incorporated while continuing to provide appropriate time for the multiplexing scheme.

As described, this approach can be used to produce estimates of angle in addition to range. In an embodiment, use of additional antennas in the set 215 of antennas would allow a narrow main lobe to be steered, on transmission, reception, or both, to produce an increase in SNR in addition to directional information. Because of the relatively short wavelengths involved, most targets will be in the far field of the arrays of moderate size that might be practical for an indoor surveillance RADAR system.

In response to two targets being present at ranges that are close enough to each other that their radar returns overlap, there is a potential for interference to be generated in the Doppler radar. Equation-9 gives the signal resulting from two overlapping radar returns in the sampled system; it is similar to Equation-8, except that there are two amplitudes, one for each target, and the overlap is denoted by $\Delta_{1,2}$ $$f(k) = A_1 A_2 A_{1,2} \cos(2\pi(f_2-f_1)kT+\theta_2-\theta_0) + \text{stationary clutter} \quad \text{Equation-9}$$

If the system has noise floor which will allow it to respond to a signal at the farthest range with amplitude $A_{far}$, when the overlap with reference burst is greater than $\Delta_{limit}$, then if $$A_1 A_2 \Delta_{1,2} > A_{far} \Delta_{limit}$$

the system will also respond to the two targets at the similar range. In an embodiment, suppose that the response is proportional to the inverse of the range squared, the maximum range is 40 ft, and the system responds to anything greater than a 0.1 fractional overlap at the maximum range. (These parameters would allow tracking of targets at the extreme range.) In this case, the product $A_{far} D_{limit}$ would be proportional to 0.0000625. Two targets of the same cross-section at 10 ft with 100% overlap would give $A_1 A_2 \Delta_{1,2}=0.0001$, and would therefore cause a spurious response that would be larger in power than the legitimate response from the single far target. This effect can be accentuated if the high-pass filter 136 in FIG. 8 allows increasing response with higher frequency in its passband. Note that the spurious Doppler response depends on relative motion of the targets in range, that is, the range difference of the targets is changing with time. The spurious Doppler response of two targets moving in opposite directions will have higher frequency than either of the targets detected separately.

Figure 14:
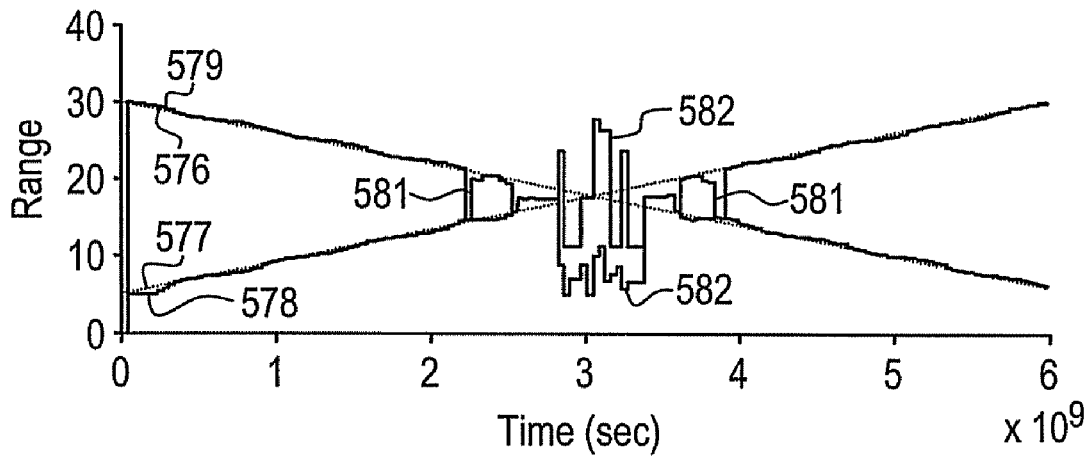
FIG. 14 depicts a simulation of tracking the range of two moving targets in accordance with an embodiment of the invention.

FIG. 14 gives the results of a simulation 575 in which two targets start at different ranges and move towards each other, crossing ranges after 3 seconds and then moving away from each other. This depicts the results of target interference. For the first 2.5 seconds, the targets, represented by lines 576 and 577, and the estimated target positions, represented by lines 578 and 579 returns, do not overlap, and the tracking is accurate. Once the targets are close to one another, but before the spurious interaction signal is generated, the two targets begin to merge into what appears to be a single target, as depicted by the segment of the estimated target position indicated by reference numeral 581. At about 3 seconds, the spurious MTI signal 582, is generated and detection becomes very confused, after which the system detects a single target 581, followed by a return to accurate tracking. It is advantageous to eliminate the effects of multiple target interference in tracking.

In an embodiment, the ability to create directional nulls 504, 506 (via the application of a phase shift in conjunction with the transmission, reception, or both, of the bursts) in the response of the set of antennas 215 described above for direction finding can be applied to the problem of multiple target interference cancellation. In response to the null 504, 506 steered towards one of the pair of interfering targets that are separated in angle, the interference signal 582 will disappear. The radar return from the other target, which will be received with some non-zero antenna response, can be used to track that target. In response to steering the null back and forth between the two targets, perhaps in an interleaved fashion, both targets can be tracked in range. Additionally, the phase shifts required to generate the nulls can be converted to azimuthal angles, thus providing angle information for the targets.

It has been considered above that the two targets lie at different azimuthal angles, but at a similar range, and that the two targets have some change in relative range with respect to time. If the two targets are at the same angle and at the same range, their change in relative range will produce a spurious Doppler signal. However a null steered to eliminate that signal will block both returns, and range estimation will not be possible.

In order to estimate the angles at which to steer the nulls, the relative weight of the two antenna 216, 217 outputs must be adapted until the interference signal is minimized. This must occur in an on-line manner, since the target locations and velocities change. In general, this adaptation could be performed by an adaptive signal processing algorithm, such as a least mean squares (LMS) algorithm, used in the mode of adaptive interference cancellation. As a simple alternative, a search algorithm will be described below to perform the adaptation.

Figure 15:
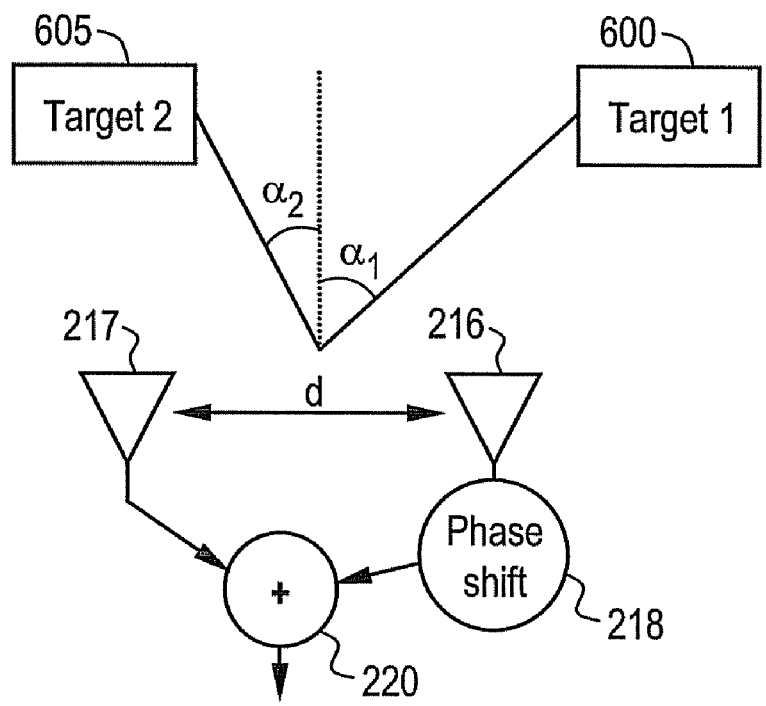
FIG. 15 depicts a top view of a block schematic diagram of an exemplary RADAR system tracking two targets in accordance with an embodiment of the invention.

Referring now to FIG. 15, assume that two far-field targets 600, 605 of approximately the same range are positioned at angles $\alpha_1$ and $\alpha_2$ from the broadside angle, and that the outputs from the two antennas 216, 217, separated by distance d, are added together with a phase shift applied to one of them. We can represent this using the analytical signal representations of the bandpass observations, and in this case the phase shift can be represented as a complex multiplication in our equations. (The analytical signal is a well-known approach to analysis and is equal to the signal minus $\sqrt{-1}$ times its Hilbert transform.) In this case, the output of the signal summation device during the time when the pulses overlap will be a complex signal $$f(t) = WA_1 e^{j2\pi f_1 t + \theta_1} + A_1 e^{j2\pi f_1 \left(t - \frac{d \sin \alpha_1}{c}\right) + \theta_1} + \\ A_2 e^{j2\pi f_2 t + \theta_2} + WA_2 e^{j2\pi f_2 \left(t - \frac{d \sin \alpha_2}{c}\right) + \theta_2} \quad \text{Equation-10}$$

where:

W is a complex-values weight representing the phase shift;
$\alpha_1$ is the angle of the first target;
$\alpha_2$ is the angle of the second target;
$f_1$ and $f_2$ are the Doppler-shifted (positive) center frequencies of the two returns; and
c is the speed of light.

The objective of the adaptation is to adjust the value of W so that one of the signals, such as target 1 600 for example, is blocked out. This occurs when $$W = -\exp\left(j2\pi f_1 \frac{d \sin \alpha_1}{c}\right) \quad \text{Equation-11}$$

where d is the separation between the antennas.

When this value of W is used in Equation 10, we have $$f(t) = A_2 \left[ e^{j2\pi f_2 t + \theta_2} + e^{j2\pi f_2 \left(t - \frac{d \sin \alpha_2}{c} - \frac{f_1 d \sin \alpha_1}{f_2 c}\right) + \theta_2} \right] \quad \text{Equation-12} \\ = A_2 \left[ 1 + e^{-j2\pi f_2 \left(\frac{d \sin \alpha_2}{c} + \frac{f_1 d \sin \alpha_1}{f_2 c}\right)} \right] e^{j2\pi f_2 t + \theta_2}$$

so that the output of the array is a phase-shifted version of the return from target 2 605 with modified amplitude. Thus, the weight of Equation-11 cancels one of the signals, but it can also attenuate or amplify the other signal, depending on the argument of the complex exponential in the brackets in Equation-12. FIG. 15

Note that the frequency used in the phase shift is that of the Doppler-shifted return from target 1 600, which is not known to the receiver. We can write this frequency as a deviation from the center frequency $f_0$: $f_1 = f_0 + D_1$. In this case, the weight in Equation-11 can be written as $$W = -\exp\left(j2\pi \left(f_0 \frac{d \sin \alpha_1}{c} + D_1 \frac{d \sin \alpha_1}{c}\right)\right) \quad \text{Equation-13}$$

For most values of $\alpha_1$, there is some other angle, $\hat{\alpha}$, such that $$f_0 \frac{d \sin \hat{\alpha}}{c} = f_0 \frac{d \sin \alpha_1}{c} + D_1 \frac{d \sin \alpha_1}{c} \quad \text{Equation-14}$$

and that angle is $$\hat{\alpha} = \arcsin\left[\frac{f_0 + D_1}{f_0} \sin \alpha_1\right] \quad \text{Equation-15}$$

which is well defined for values of $\alpha_1$ that are sufficiently lower than $\pi/2$ radians. Since $D_1$ will be so much smaller than $f_0$, we will ignore the tiny region in which $\hat{\alpha}$ is not well defined and use $$W = -\exp\left(j2\pi f_0 \frac{d \sin \hat{\alpha}}{c}\right) \quad \text{Equation-16}$$

The value of $\hat{\alpha}$ will be found by searching for a value that minimizes the spurious Doppler signal 582 energy over a large number of possible angles. The value of $\hat{\alpha}$ will be reported to be the estimate of the angle of arrival, since an estimate of $D_1$ is not available.

In order to search for the angles a standard line search algorithm, such as the Golden Section search, applied to the $\hat{\alpha}$ domain, $$\left[-\frac{\pi}{2}, \frac{\pi}{2}\right]$$

will be used. In this region, the minima of the spurious Doppler response 582 will be found, which can be evaluated at every prospective value of $\hat{\alpha}$ by estimating the energy of the output over some number of transmitted pulses with the computed weight in place. The spurious Doppler response 582 is expected to have as many zeros as there are targets, and the search algorithm will have to search for the second and subsequent targets after the first is located by limiting the range of the search algorithm to exclude angles at which a target has already been found. Note that during this phase of locating the interfering targets, it is preferred to stop transmitting the reference pulse, to avoid cancellation of the spurious Doppler signal.

The result of the proposed processing on the situation depicted in FIG. 14 will be as follows. As the targets approach each other in range, and before the spurious Doppler response 582 is detectable, they will appear to merge, as depicted by the response 581. The local system 199 will report this number of targets to the system at the next level up, which will handle the ambiguity through track association in 3-space. After the spurious Doppler signal 582 is observed, the local system knows that more than one target must be present. If two targets are in fact present at the same range, but at different angles, the adaptive nulling will allow first one and then the other to be illuminated and to have its range tracked. Even if the targets are too close in angle to separate using adaptive nulling, the local system can still report the presence of multiple targets and the last range at which targets were observed. Note that when three or more targets are present, adaptive nulling can still eliminate the spurious Doppler signal, provided that only two of the targets are at the same range. When three targets are at the same range, the system cannot track them, but it still knows that two or more targets are present.

Figure 16:
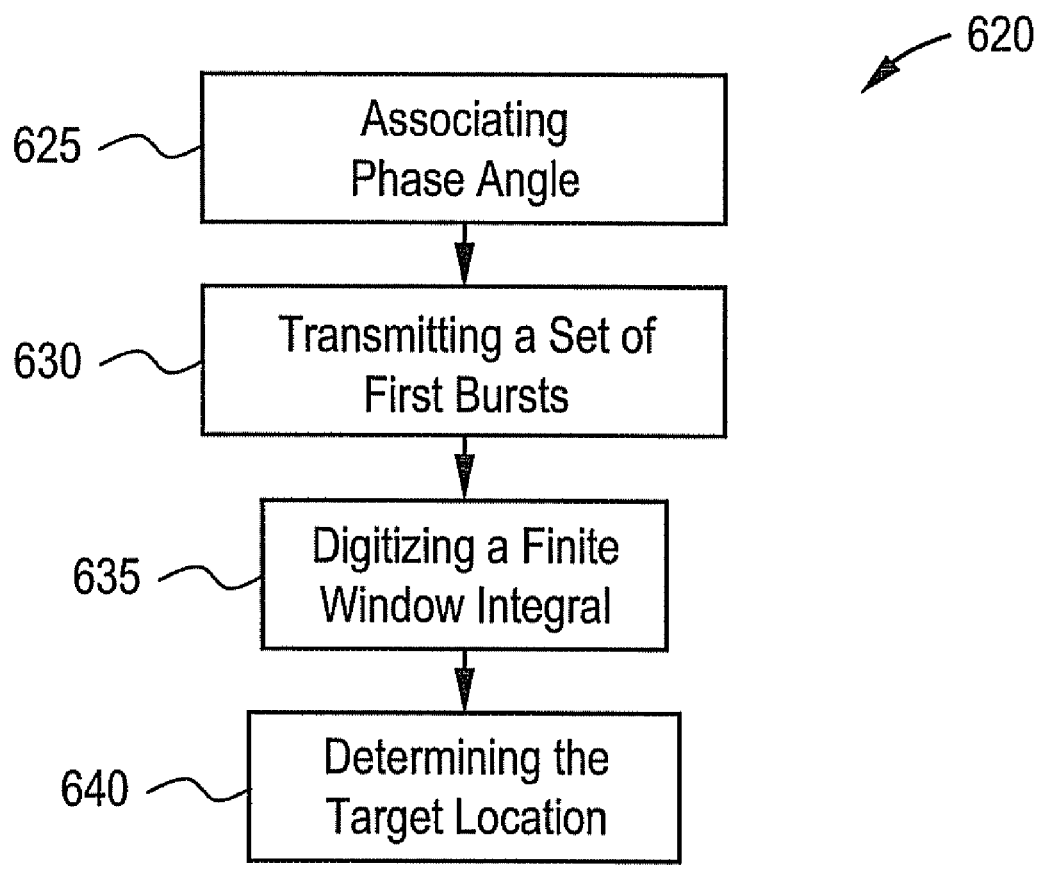
FIG. 16 depicts a flow chart diagram for determining the location of two targets by azimuth via an adaptive nulling method in accordance with an embodiment of the invention.

Referring now to FIG. 16, an exemplary embodiment of an adaptive nulling method 620 to track multiple targets is depicted. The method begins by associating 625 a phase angle with each horizontal angular position of a first set of horizontal angular positions, by way of a look-up table, for example. In response to a spurious signal 582 showing targets at a plurality of ranges, thereby indicating more than one target at the same range, transmitting 630 a set of first bursts in response to the first pulses for each horizontal angular position of the first set of horizontal angular positions. In response to the reflection of the transmitted 630 bursts from the plurality of targets, digitizing 635 the finite window integral of the reflected first burst associated with each of the transmitted first bursts associated with the first set of horizontal angular positions, and finally, determining 640 the target location of one of the more than one targets by horizontal angular position based on the lowest finite window integral using an adaptive algorithm to compute and transmit each phase angle associated with the first set of horizontal angular positions as required during its search for the target directions. For example, using the Golden Section search, the algorithm will begin with transmission of nulls in two predetermined directions, with a third, and subsequent, null steering directions be computed from the results of the analysis of previous transmissions. Thus, the sequence of horizontal directions in the search is "adaptive". In an embodiment, the digitizing 635 the finite window integral comprises producing a phase shift of each associated phase angle, between the first 216 and second 217 antenna of the set 215 of antennas and triggering the analog-to-digital converter 226 at an appropriate time synchronized to the transmission of the second burst.

Subsequent to the method 620 to determine the horizontal angular positions of the multiple targets within the same range, null steering, as described above, may be used to block the response of one target, allowing the range of the other target to be determined, as previously described. Likewise, knowing the horizontal angular position of the second target allows the range of the first target to be determined.

Figure 17:
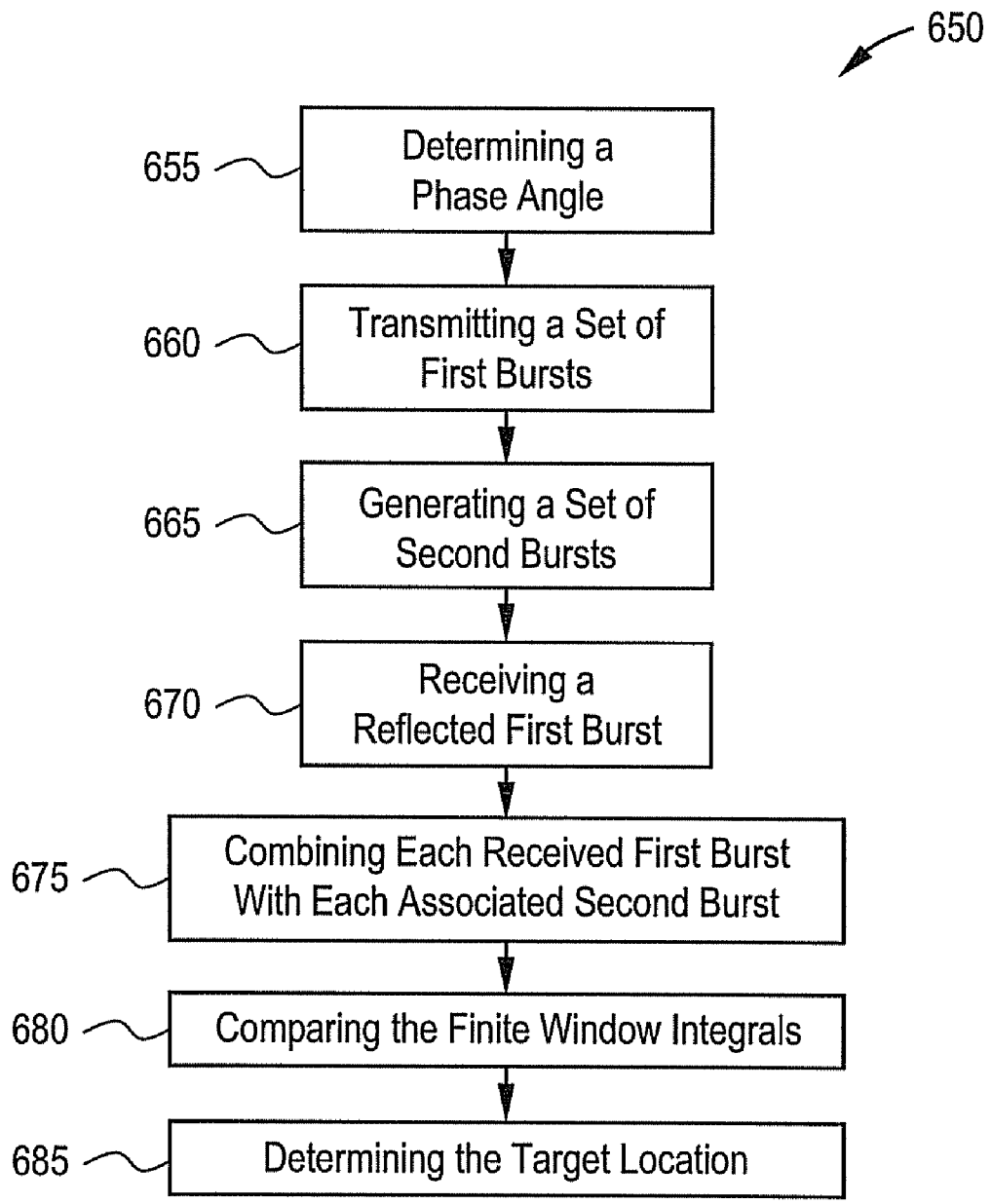
FIG. 17 depicts a flow chart diagram for determining the location of two targets by range in accordance with an embodiment of the invention.

Referring now to FIG. 17, an embodiment of a method 650 to determine the range of each target is depicted. In response to determining 640 the target location of the more than one target by horizontal position, determining 655 a phase angle corresponding to each horizontal angular position of a second set of horizontal angular positions, the second set of horizontal positions being associated with the locations of each target determined 640 above. The method proceeds by transmitting 660 a set of first bursts in response to the first pulses for each range and horizontal angular position of the set of ranges and the second set of horizontal angular positions. In this case, where more than one target is present, null steering is used to block the response of one target to allow the range of the other target to be determined. The method 650 continues with generating 665 a set of second bursts in response to the second pulses for each horizontal angular position, each second burst subsequent to each first burst, and capable of transmission.

In response to the reflection of the transmitted first burst from the target, receiving 670 a reflected first burst associated with each of the transmitted first bursts associated with the second set of horizontal angular positions, and combining 675 each received reflected first burst with each associated second burst for each horizontal angular position of the second set of horizontal angular positions and integrating to create a finite window integral. In an embodiment, the generating 665 comprises generating the set of second bursts absent transmission of the set of second bursts.

The method proceeds with calculating and comparing 680 to each other the finite window integrals at each horizontal angular position of the second set of horizontal angular positions; and finally, determining 685 the target location by range and horizontal angular position based on the finite window integral. In an embodiment, the determining 685 specifically includes summing the squared, high pass filtered sequence of finite window integrals to produce an energy estimate proportional to the square of the Doppler signal amplitude as the basis for comparison of range cells.

In an embodiment, at least one of the transmitting 660 or the receiving 670, for each horizontal angular position of the second set of horizontal angular positions, comprises a phase shift of the determined phase angle, between the first 216 and the second 217 antenna of the set 215 of antennas. In an alternate embodiment, only the receiving comprises the phase shift. In an embodiment, digital signal processing, as described above will allow for interleaving of the received finite window integrals and increased estimate accuracy.

As disclosed, some embodiments of the invention may include some of the following advantages: the ability to determine the range of a target location; the ability to increase range measurement accuracy by interleaving the finite window integral responses; the ability to determine horizontal angular position of target location by beam steering or null steering; the ability to increase horizontal angular position accuracy by interleaving the finite window integral responses; the ability to determine multiple target locations by adaptive nulling; and the ability to increase multiple target location accuracy by interleaving the finite window integral responses.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A RADAR system comprising a set of RADAR apparatuses, each apparatus comprising:
a processor;
a pulse unit in signal communication with the processor, the pulse unit having a first delay stage configured to provide a plurality of first pulses and a second delay stage configured to provide a plurality of second pulses, each first pulse having a variable delay controlled by the processor to allow one of the plurality of second pulses to follow each first pulse;
a waveform signal generator in signal communication with the pulse unit, the waveform signal generator for generating a waveform signal in response to each pulse of the first and second plurality of pulses;
a set of radar antennas in signal communication with the waveform signal generator, the set of antennas for transmitting a burst of microwave energy in response to each waveform signal generated by the waveform signal generator and to receive a plurality of reflected bursts associated with each said burst of microwave energy transmitted from the set of antennas;
an acquisition unit in signal communication with the set of antennas for developing and amplifying a finite window integral of at least one reflected burst; and
a pre-processor in signal communication with the acquisition unit and the processor, the pre-processor for digitizing and storing information relating to each finite window integral for subsequent processing.

2. The system of claim 1, wherein the set of radar antennas comprises a first and a second antenna, the system further comprising:
at least one phase shifter in signal communication with the first antenna, the phase shifter for phase-shifting the bursts associated with the first antenna relative to the bursts associated with the second antenna.

3. The system of claim 2, wherein:
the set of radar antennas comprises two radar antennas.

4. The system of claim 1, wherein the waveform signal generator comprises:
a radiation intensity control in signal communication with the processor, the radiation intensity control for varying the intensity of the radiation of the bursts inversely to the variable delay of the first delay stage.

5. The system of claim 1, wherein:
the acquisition unit comprises a wideband high gain amplifier for amplifying the finite window integral.

6. The system of claim 1, wherein:
the processor comprises a field programmable gate array.

7. The system of claim 1, wherein the pre-processor comprises:
a sample and hold analog to digital converter for digitizing each amplified finite window integral; and
a plurality of storage locations for storing each of the digitized finite window integrals;
wherein the processor controls selection of the storage location to store the digitized finite window integrals.

8. The system of claim 1, wherein:
each second pulse has a fixed delay.

9. The system of claim 1, wherein:
the waveform signal generator generates a waveform conforming to ISM bands.

10. A method to determine a target location using a RADAR apparatus comprising: a processor; a pulse unit in signal communication with the processor, the pulse unit having a first delay stage for providing a plurality of first pulses and a second delay stage for providing a plurality of second pulses, each first pulse having a variable delay controlled by the processor for allowing one of the plurality of second pulses to follow each of the first pulses; a waveform signal generator in signal communication with the pulse unit, the waveform signal generator for generating a waveform signal in response to each pulse of the pluralities of first and second pulses; a set of radar antennas in signal communication with the waveform signal generator, the set of antennas for transmitting a burst of microwave energy in response to each waveform signal generated by the waveform signal generator and for receiving a plurality of reflected bursts associated with the transmitted bursts; an acquisition unit in signal communication with the set of antennas for detecting and amplifying a finite window integral of at least one reflected burst; and a pre-processor in signal communication with the acquisition unit and the processor, the pre-processor for digitizing and storing information relating to each finite window integral for subsequent processing, the method comprising:
defining a delay of the variable delay for each of a set of ranges within a region containing the target;
transmitting a set of first bursts in response to the first pulses for each range;
generating a set of second bursts in response to the second pulses for each range, each second burst subsequent to each first burst and for transmission;
receiving a reflected first burst associated with each of the transmitted first bursts associated with each range;
combining each received reflected first burst with each associated second burst associated with each range to create the finite window integral;
calculating and comparing to each other the finite window integrals at each range; and
determining the target location by range based on the greatest finite window integral from the set of ranges.

11. The method of claim 10, further comprising:
determining the set of ranges to evaluate.

12. The method of claim 11, wherein the determining the set of ranges to evaluate comprises a tracking algorithm, the algorithm comprising:
selecting an initial, small number of large ranges to determine presence of the target;
in response to the presence of the target, selecting a large number of small ranges to estimate the target distance;
in response to estimating the target distance, selecting a subset of small ranges centered about the estimated target distance to calculate the target distance; and
in response to motion of the target, changing the center of the subset of small ranges to the range having the greatest finite window integral.

13. The method of claim 10, further comprising:
changing the transmission of bursts from one range of the set of ranges to another range;
wherein the changing occurs in response to a dwell time having elapsed subsequent to initiation of the transmitting the set of bursts for each range of the set of ranges; and
wherein the comparing the finite window integrals at each range occurs subsequent to the dwell time associated with that range.

14. The method of claim 10, further comprising:
defining a radiation intensity for each range.

15. The method of claim 10, the method further comprising:
subsequent to the combining each received reflected first burst with the associated second burst to create the finite window integral, digitizing the finite window integral and storing the digitized finite window integral in a storage location selected by the processor.

16. The method of claim 15, further comprising:
changing the transmission of bursts from one range of the set of ranges to another range;
wherein the changing occurs following the second pulse corresponding to the range; and
wherein the comparing the finite window integrals at each range comprises digital signal processing to compare the stored finite window integrals at all ranges of the set of ranges subsequent to a single dwell time associated with all ranges having elapsed.

17. The method of claim 10, further comprising:
determining a phase angle corresponding to each of a set of horizontal angular positions associated with a region containing the target;
transmitting a set of first bursts in response to the first pulses for each horizontal angular position of the set of horizontal angular positions;
generating a set of second bursts in response to the second pulses for each horizontal angular position, each second burst subsequent to each first burst, and for transmission;
receiving a reflected first burst associated with each of the transmitted first bursts associated with the set of horizontal angular positions;
combining each received reflected first burst with each associated second burst for each horizontal angular position of the set of horizontal angular positions to create the finite window integral;
calculating and comparing to each other the finite window integrals at each horizontal angular position; and
determining the target location by horizontal angular position based on the finite window integral;
wherein at least one of the transmitting or the receiving, for each horizontal angular position, comprises a phase shift of the determined phase angle between a first and second antenna of the set of antennas.

18. The method of claim 17, wherein:
only the receiving comprises the phase shift.

19. The method of claim 17, further comprising:
determining the set of ranges to evaluate.

20. The method of claim 19, wherein the determining the set of ranges to evaluate comprises a tracking algorithm, the algorithm comprising:
selecting an initial, small number of large ranges to determine presence of the target;
in response to the presence of the target, selecting a large number of small ranges to estimate the target distance;
in response to estimating the target distance, selecting a subset of small ranges centered about the estimated target distance to calculate the target distance; and
in response to motion of the target, changing the center of the subset of small ranges to the range having the greatest finite window integral.

21. The method of claim 19, wherein:
the determining the set of ranges to evaluate comprises determining the ranges in which the target distance has been previously calculated.

22. The method of claim 17, further comprising:
changing the transmission of bursts from one range of the set of ranges to another range;
wherein the changing occurs in response to a dwell time having elapsed subsequent to initiation of the transmitting the set of bursts for each range of the set of ranges; and
wherein the comparing the finite window integrals at each range occurs subsequent to the dwell time associated with that range.

23. The method of claim 22, further comprising:
changing the transmission of bursts from one combination of range and horizontal angular position of the sets of ranges and horizontal angular positions to another combination of range and horizontal angular position;
wherein the changing occurs in response to a dwell time having elapsed subsequent to initiation of the transmitting the set of bursts for each combination of range and horizontal angular position of the sets of ranges and horizontal angular positions; and
wherein the comparing the finite window integrals at each combination of range and horizontal angular position occurs subsequent to the dwell time associated with that combination of range and horizontal angular position.

24. The method of claim 17, further comprising:
subsequent to the combining each reflected first burst, digitizing the finite window integral and storing the digitized energy in a storage location selected by the processor.

25. The method of claim 24, further comprising:
changing the transmission of bursts from one combination of range and horizontal angular position of the sets of ranges and horizontal angular positions to another combination of range and horizontal angular position;
wherein the changing occurs following the second pulse corresponding to the combination of range and horizontal angular position; and
wherein the comparing the finite window integrals at each combination of range and horizontal angular position comprises digital signal processing to compare the stored finite window integrals at all combinations of range and horizontal angular position of the sets of ranges and horizontal angular positions subsequent to a single dwell time associated with all combinations of range and horizontal angular position having elapsed.

26. The method of claim 17, further comprising:
determining a set of horizontal angular positions to evaluate.

27. The method of claim 17, wherein:
the determining a target location is based on the least finite window integral from the set of horizontal angular positions.

28. The method of claim 10, the method further comprising:
associating a phase angle with each horizontal angular position of a first set of horizontal angular positions;
in response to a spurious signal showing targets at a plurality of ranges, thereby indicating more than one target at the same range, transmitting a set of first bursts in response to the first pulses for each horizontal angular position of the first set of horizontal angular positions;
digitizing the finite window integral of the reflected first burst associated with each of the transmitted first bursts associated with the first set of horizontal angular positions; and
determining the target location of the more than one targets by horizontal angular position based on the lowest finite window integral using an adaptive algorithm;

wherein the receiving the finite window integral comprises a phase shift of the associated phase angle, between a first and second antenna of the set of antennas.

29. The method of claim 28, further comprising:
in response to determining the target location of the more than one target by horizontal position, determining a phase angle corresponding to each horizontal angular position of a second set of horizontal angular positions associated with each target location;
transmitting a set of first bursts in response to the plurality of first pulses for each range and horizontal angular position of the set of ranges and the second set of horizontal angular positions;
generating a set of second bursts in response to the second pulses for each horizontal angular position, each second burst subsequent to each first burst, and for transmission;
receiving a reflected first burst associated with each of the transmitted first bursts associated with the second set of horizontal angular positions;
combining each received reflected first burst with each associated second burst for each horizontal angular position of the second set of horizontal angular positions to create the finite window integral;
calculating and comparing to each other the finite window integrals at each horizontal angular position of the second set of horizontal angular positions; and
determining the target location of the more than one target by range position based on the finite window integral;
wherein at least one of the transmitting or the receiving, for each horizontal angular position of the second set of horizontal angular positions, comprises a phase shift of the determined phase angle, between a first and second antenna of the set of antennas.

30. The method of claim 29, wherein:
only the receiving comprises the phase shift.

31. The method of claim 28, wherein:
the adaptive algorithm is an LMS algorithm.

32. The method of claim 28, further comprising:
changing the transmission of bursts from one range of the set of ranges to another range;
wherein the changing occurs in response to a dwell time having elapsed subsequent to initiation of the transmitting the set of bursts for each range of the set of ranges; and
wherein the comparing the finite window integrals at each range occurs subsequent to the dwell time associated with that range.

33. The method of claim 32, further comprising:
changing the transmission of bursts from one combination of range and horizontal angular position of the sets of ranges and horizontal angular positions to another combination of range and horizontal angular position;
wherein the changing occurs in response to a dwell time having elapsed subsequent to initiation of the transmitting the set of bursts for each combination of range and horizontal angular position of the sets of ranges and horizontal angular positions; and
wherein the comparing the finite window integrals at each combination of range and horizontal angular position occurs subsequent to the dwell time associated with that combination of range and horizontal angular position.

34. The method of claim 28, the method further comprising:
subsequent to the combining each reflected first burst, digitizing the finite window integral and storing the digitized finite window integral in a storage location selected by the processor.

35. The method of claim 34, further comprising:
changing the transmission of bursts from one combination of range and horizontal angular position of the sets of ranges and horizontal angular positions to another combination of range and horizontal angular position;
wherein the changing occurs following the second pulse corresponding to the combination of range and horizontal angular position; and
wherein the comparing the finite window integrals at each combination of range and horizontal angular position comprises digital signal processing to compare the stored finite window integrals at all combinations of range and horizontal angular position of the sets of ranges and horizontal angular positions subsequent to a single dwell time associated with all combinations of range and horizontal angular position having elapsed.

36. A method to determine a target location using a RADAR apparatus comprising: a processor; a pulse unit in signal communication with the processor, the pulse unit having a first delay stage for providing a plurality of first pulses and a second delay stage for providing a plurality of second pulses, each first pulse having a variable delay controlled by the processor for allowing one of the plurality of second pulses to follow each first pulse; a waveform signal generator in signal communication with the pulse unit, the waveform signal generator for generating a waveform signal in response to each pulse of the pluralities of first and second pulses; a set of radar antennas in signal communication with the waveform signal generator, the set of antennas for transmitting a burst of microwave energy in response to each waveform signal generated by the waveform signal generator and for receiving a plurality of reflected bursts associated with the transmitted bursts; an acquisition unit in signal communication with the set of antennas detecting and amplifying a finite window integral of at least one reflected burst; and a pre-processor in signal communication with the acquisition unit and the processor, the pre-processor for digitizing and storing information relating to each finite window integral for subsequent processing, the method comprising:
determining a phase angle corresponding to each of a set of horizontal angular positions associated with a region containing the target;
transmitting a set of first bursts in response to the first pulses for each horizontal angular position of the set of horizontal angular positions;
generating a set of second bursts in response to the second pulses for each horizontal angular position, each second burst subsequent to each first burst, and for transmission;
receiving a reflected first burst associated with each of the transmitted first bursts associated with the set of horizontal angular positions;
combining each received reflected first burst with each associated second burst for each horizontal angular position of the set of horizontal angular positions to create the finite window integral;
calculating and comparing to each other the finite window integrals at each horizontal angular position; and
determining a target location by horizontal angular position based on the finite window integral;
wherein at least one of the transmitting or the receiving comprises a phase shift of the determined phase angle between a first and second antenna of the set of antennas.

37. The method of claim 36, wherein:
only the receiving comprises the phase shift.

38. The method of claim 36, further comprising:
determining a set of horizontal angular positions to evaluate.

39. The method of claim 36, wherein:
the determining a phase angle comprises determining a phase angle corresponding to each horizontal angular position; and
the determining a target location is based on the least finite window integral from the set of horizontal angular positions.

40. The method of claim 36, further comprising:
changing the transmission of bursts from one horizontal angular position of the set of horizontal angular positions to another horizontal angular position;
wherein the changing occurs in response to a dwell time having elapsed subsequent to initiation of the transmitting the set of bursts for each horizontal angular position of the set of horizontal angular positions; and;
wherein the comparing the finite window integrals at each horizontal angular position occurs subsequent to the dwell time associated with that horizontal angular position.

41. The method of claim 36, the method further comprising:
subsequent to the combining each reflected first burst, digitizing the finite window integral and storing the digitized energy in a storage location selected by the processor.

42. The method of claim 41, further comprising:
changing the transmission of bursts from one horizontal angular position of the set of horizontal angular positions to another horizontal angular position;
wherein the changing occurs following the second pulse corresponding to the horizontal angular position; and
wherein the comparing the finite window integrals at each horizontal angular position comprises digital signal processing to compare the stored finite window integrals at all horizontal angular positions of the set of horizontal angular positions subsequent to a single dwell time associated with all horizontal angular positions having elapsed.

* * * * *

UNITED STATES PATENT AND TRADEMARK OFFICE
CERTIFICATE OF CORRECTION

PATENT NO. : 7,466,261 B1  Page 1 of 1
APPLICATION NO. : 11/460143
DATED : December 16, 2008
INVENTOR(S) : Hoctor et al.

It is certified that error appears in the above-identified patent and that said Letters Patent is hereby corrected as shown below:

In column 3, Line 20, in Equation 3, delete

"$f(t) = A_1 \sum_{k=\infty}^{\infty} \cos(2\pi(f_0 - f_1)kT + \theta_0 - \theta_1) rect_\Delta(t - kT)$" and insert -- $f(t) = A_1 \sum_{k=-\infty}^{\infty} \cos(2\pi(f_0 - f_1)kT + \theta_0 - \theta_1) rect_\Delta(t - kT)$ --, therefor.

In column 3, Line 40, delete "so at" and insert -- so that --, therefor.

Signed and Sealed this

Twenty-fourth Day of February, 2009

JOHN DOLL
*Acting Director of the United States Patent and Trademark Office*